(12) United States Patent
Yeo et al.

(10) Patent No.: US 12,218,751 B2
(45) Date of Patent: Feb. 4, 2025

(54) APPARATUS AND METHOD FOR LIMITED BUFFER RATE MATCHING (LBRM) IN A WIRELESS COMMUNICATION SYSTEM

(71) Applicant: Samsung Electronics Co., Ltd., Gyeonggi-do (KR)

(72) Inventors: Jeongho Yeo, Gyeonggi-do (KR); Seho Myung, Gyeonggi-do (KR); Yongok Kim, Gyeonggi-do (KR); Taehyoung Kim, Gyeonggi-do (KR); Jinyoung Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 337 days.

(21) Appl. No.: 17/628,114

(22) PCT Filed: Jul. 17, 2020

(86) PCT No.: PCT/KR2020/009485
§ 371 (c)(1),
(2) Date: Jan. 18, 2022

(87) PCT Pub. No.: WO2021/010803
PCT Pub. Date: Jan. 21, 2021

(65) Prior Publication Data
US 2022/0278768 A1 Sep. 1, 2022

(30) Foreign Application Priority Data

Jul. 18, 2019 (KR) .................. 10-2019-0087187
Aug. 30, 2019 (KR) .................. 10-2019-0106975

(51) Int. Cl.
*H04L 1/00* (2006.01)
*H04W 72/044* (2023.01)

(52) U.S. Cl.
CPC .......... *H04L 1/0013* (2013.01); *H04L 1/0006* (2013.01); *H04W 72/044* (2013.01)

(58) Field of Classification Search
CPC ... H04L 1/0013; H04L 1/0006; H04L 5/0023; H04L 5/001; H04L 5/0053; H04L 1/0061;
(Continued)

(56) References Cited

U.S. PATENT DOCUMENTS

2009/0232050 A1* 9/2009 Shen ................. H04L 47/10
370/328
2016/0105873 A1* 4/2016 Gaal ................. H04L 5/0005
370/330
(Continued)

FOREIGN PATENT DOCUMENTS

KR  10-2017-0070033  6/2017
KR  10-2020-0099941  8/2020
WO  WO 2019/038698  2/2019

OTHER PUBLICATIONS

F. Hamidi-Sepehr, A. Nimbalker and G. Ermolaev, "Analysis of 5G LDPC Codes Rate-Matching Design," 2018 IEEE 87th Vehicular Technology Conference (VTC Spring), Porto, Portugal, 2018, pp. 1-5, doi: 10.1109/VTCSpring.2018.8417496. (Year: 2018).*

(Continued)

*Primary Examiner* — Ayaz R Sheikh
*Assistant Examiner* — Tarell A Hampton
(74) *Attorney, Agent, or Firm* — The Farrell Law Firm, P.C.

(57) ABSTRACT

The disclosure relates to a $5^{th}$ Generation (5G) or pre-5G communication system for supporting a higher data rate after a $4^{th}$ Generation (4G) communication system such as long term evolution (LTE). The disclosure is for transmitting and receiving data and control information in a wireless communication system. A method of operating a terminal may include receiving from a base station an instruction for Limited Buffer Rate Matching (LBRM), obtaining at least one parameter required to perform the LBRM, determining (Continued)

a limited range of parity bits for the LBRM, based on the parameters, and transmitting or receiving data, based on the limited range.

14 Claims, 18 Drawing Sheets

(58) Field of Classification Search
CPC ....... H04L 1/00; H04L 1/0023; H04L 1/0065; H04W 72/044
See application file for complete search history.

(56) References Cited

U.S. PATENT DOCUMENTS

| 2019/0082450 | A1 | 3/2019 | Ying et al. |
| 2019/0141647 | A1 | 5/2019 | Nimbalker et al. |
| 2020/0266928 | A1 | 8/2020 | Yeo et al. |
| 2022/0104232 | A1* | 3/2022 | Nimbalker .......... H04L 27/2607 |

OTHER PUBLICATIONS

Intel Corporation, "Finalization of remaining details of rate-matching", R1-1716329, 3GPP TSG RAN WG1 Meeting NR #3 Nagoya Japan Sep. 18-21, 2017. (Year: 2017).*
PCT/ISA/210 Search Report issued on PCT/KR2020/009485, Oct. 30, 2020, pp. 3.
PCT/ISA/237 Written Opinion issued on PCT/KR2020/009485, Oct. 30, 2020, pp. 4.
3GPP, 3rd Generation Partnership Project; Technical Specification Group Radio Access Network; NR; Multiplexing and Channel Coding (Release 15), 3GPP TS 38.212 V 15.6.0, Jun. 2019, pp. 101.
Korean Office Action dated Sep. 19, 2024 issued in counterpart application No. 10-2019-0106975, 11 pages.

* cited by examiner

APPARATUS AND METHOD FOR LIMITED BUFFER RATE MATCHING (LBRM) IN A WIRELESS COMMUNICATION SYSTEM

PRIORITY

This application is a National Phase Entry of International Application No. PCT/KR2020/009485, which was filed on Jul. 17, 2020, and claims priority to Korean Patent Applications No. 10-2019-0087187 and 10-2019-0106975, filed in the Korean Intellectual Property Office on Jul. 18, 2019 and Aug. 30, 2019, respectively, the entire content of each of which is incorporated herein by reference.

TECHNICAL FIELD

The disclosure relates in general to a wireless communication system, and in particular, to a method and apparatus for transmitting/receiving data and control information in the wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the development of the wireless communication system such as a 5G system, it is expected to provide various services. Accordingly, there is a need for a method for smoothly providing the services.

Based on the above discussion, the disclosure provides an apparatus and method for effectively performing rate matching in a wireless communication system.

In addition, the disclosure provides an apparatus and method for limiting transmittable parity bits in a wireless communication system.

In addition, the disclosure provides an apparatus and method for determining a limited range of transmittable parity bits in a wireless communication system.

In addition, the disclosure provides an apparatus and method for determining parameters for determining a limited range of transmittable parity bits in a wireless communication system.

In addition, the disclosure provides an apparatus and method for determining a band combination used for Carrier Aggregation (CA) among a plurality of band combinations in a wireless communication system.

In addition, the disclosure provides an apparatus and method for determining the maximum number of layers when a plurality of Bandwidth Parts (BWPs) are configured in a wireless communication system.

SUMMARY

According to various embodiments of the disclosure, a method of operating a terminal in a wireless communication system may include receiving from a base station an instruction for Limited Buffer Rate Matching (LBRM), obtaining at least one parameter required to perform the LBRM, determining a limited range of parity bits for the LBRM, based on the parameters, and transmitting or receiving data, based on the limited range.

According to various embodiments of the disclosure, a terminal in a wireless communication system includes a transceiver and at least one processor coupled to the transceiver. The at least one processor may receive from a base station an instruction for LBRM, obtain at least one parameter required to perform the LBRM, determine a limited range of parity bits for the LBRM, based on the parameters, and transmit or receive data, based on the limited range.

An apparatus and method according to various embodiments of the disclosure may effectively perform rate matching by using limited parity bits.

Technical problems to be achieved in the disclosure are not limited to the technical problems mentioned above, and other technical problems not mentioned herein may be clearly understood by those skilled in the art to which the disclosure pertains from the following descriptions.

DETAILED DESCRIPTION

Figure 1:
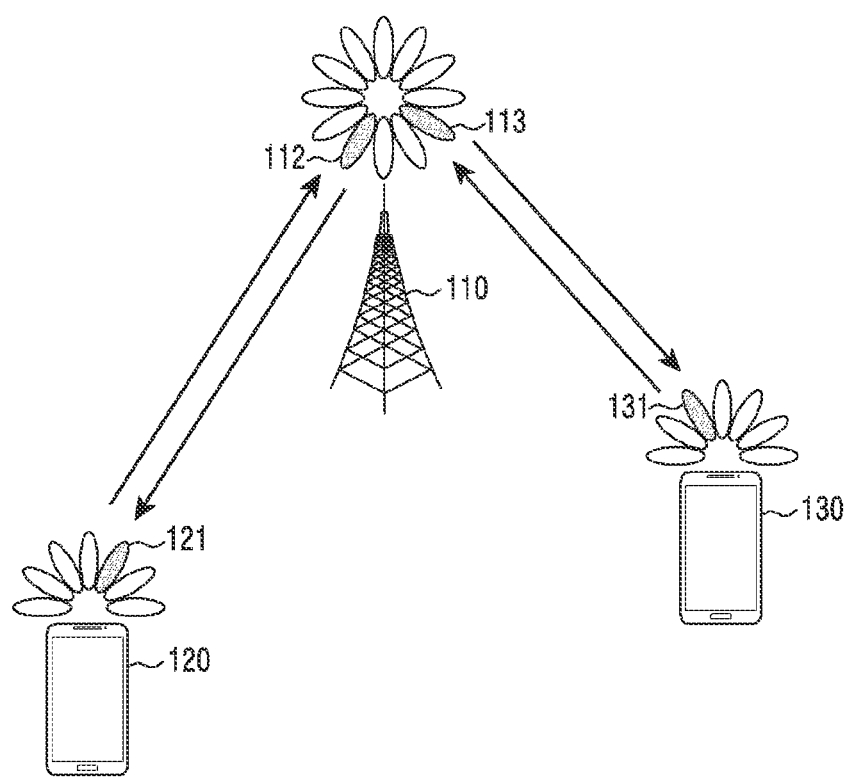
FIG. 1 illustrates a wireless communication system according to various embodiments of the disclosure.

Terms used in the disclosure are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

The disclosure described hereinafter relates to an apparatus and method for transmitting and receiving data and control information in a wireless communication system. Specifically, in a technique described in the disclosure, information on a band set assumed by a base station is indicated to a user equipment (UE) according to UE capability information, and the UE uses configuration information provided from the base station to calculate a transmission/reception parameter.

Terms used hereinafter to refer to a signal, a channel, control information, a message, network entities, a component of a device, or the like are exemplified for convenience of explanation. Therefore, the disclosure is not limited to the terms described below, and thus other terms have the same technical meaning may also be used. For example, a peak data rate and a max data rate may be used interchangeably in the disclosure. In the following description, a physical channel and a signal may be used interchangeably with data or a control signal. For example, although a Physical Downlink Shared Channel (PDSCH) is a term referring to a physical channel through which data is transmitted, the PDSCH may also be used to refer to data.

Hereinafter, in the disclosure, higher signaling refers to a method of transferring a signal from a base station to a terminal by using a downlink data channel of a physical layer or from the terminal to the base station by using an uplink data channel of the physical layer. The higher signaling may be understood as Radio Resource Control (RRC) signaling or Media Access Control (MAC) Control Element (CE).

In addition, although an expression 'greater than' or 'less than' is used in the disclosure to determine whether a specific condition is fulfilled, this is for exemplary purposes only and does not exclude an expression of 'greater than or equal to' or 'less than or equal to'. A condition described as "greater than or equal to" may be replaced with "greater than". A condition described as "less than or equal to" may be replaced with "less than". A condition described as "greater than or equal to and less than" may be replaced with "greater than and less than or equal to".

In addition, although the disclosure describes various embodiments by using terms used in some communication standards (e.g., $3^{rd}$ Generation Partnership Project (3GPP)), this is for exemplary purposes only. Various embodiments of the disclosure may be easily modified and applied to other communication systems.

FIG. 1 illustrates a wireless communication system according to various embodiments of the disclosure. As part of nodes which use a wireless channel in a wireless communication system, a base station 110, a terminal 120, and a terminal 130 are exemplified in FIG. 1. Although only one base station is illustrated in FIG. 1, another base station identical to or different from the base station 110 may be further included.

The base station 110 is a network infrastructure which provides a radio access to the terminals 120 to 130. The base station 110 has a coverage defined as a specific geographic region on the basis of a distance in which a signal is transmittable. In addition to the term 'base station', the base station 110 may be referred to as an 'Access Point (AP)', an 'eNodeB (eNB)', a '5th Generation (5G) node', a 'next generation nodeB (gNB)', a 'wireless point', a 'Transmission/Reception Point (TRP)', or other terms having equivalent technical meanings.

As a device used by a user, each of the terminals 120 to 130 communicates with the base station 110 through the wireless channel. A link from the base station 110 to the terminal 120 or the terminal 130 is referred to as a downlink (DL), and a link from the terminal 120 or the terminal 130 to the base station 110 is referred to as an uplink (UL). Optionally, at least one of the terminals 120 to 130 may be operated without user involvement. That is, as a device for performing Machine Type Communication (MTC), at least one of the terminals 120 to 130 may not be carried by the user. In addition to the term 'terminal', each of the terminals 120 to 130 may be referred to as a 'User Equipment (UE)', a 'mobile station', a 'subscriber station', a 'remote terminal', a 'wireless terminal', a 'user device', or other terms having equivalent technical meanings.

The base station 110, the terminal 120, and the terminal 130 may transmit and receive a radio signal at a millimeter Wave (mmWave) band (e.g., 28 GHz, 30 GHz, 38 GHZ, 60 GHz). In this case, to improve a channel gain, the base station 110, the terminal 120, and the terminal 130 may perform beamforming. Herein, the beamforming may include transmission beamforming and reception beamforming. That is, the base station 110, the terminal 120, and the terminal 130 may assign a directivity to a transmission signal and or a reception signal. For this, the base station 110 and the terminals 120 and 130 may select serving beams 112, 113, 121, and 131 through a beam search or beam management procedure. After the serving beams 112, 113, 121, and 131 are selected, subsequent communication may be performed through a resource having a Quasi Co-Located (QCL) relation with a resource used to transmit the serving beams 112, 113, 121, and 131.

If large-scale characteristics of a channel which has delivered a symbol on a first antenna port may be inferred from a channel which has delivered a symbol on a second antenna port, it may be evaluated that the first antenna port and the second antenna port have the QCL relation. For example, the large-scale characteristics may include at least one of a delay spread, a Doppler spread, a Doppler shift, an average gain, an average delay, and a spatial receiver parameter.

Figure 2:
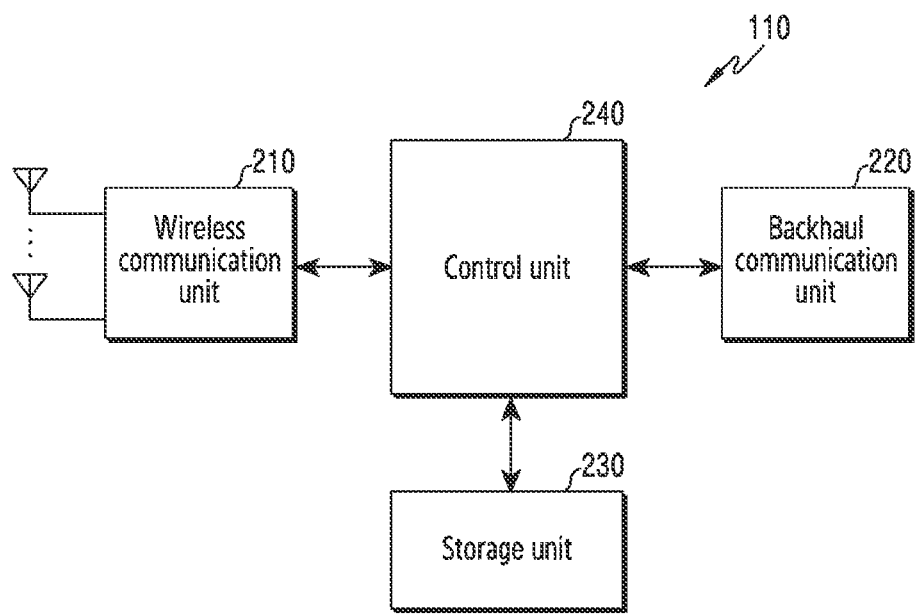
FIG. 2 illustrates a structure of a base station in a wireless communication system according to various embodiments of the disclosure.

FIG. 2 illustrates a structure of a base station in a wireless communication system according to various embodiments of the disclosure. The exemplary structure of FIG. 2 may be understood as a structure of the first base station 110. Hereinafter, the term ' . . . unit', ' . . . device', or the like implies a unit of processing at least one function or operation, and may be implemented in hardware or software or in combination of the hardware and the software. Referring to FIG. 2, the base station 110 includes a wireless communication unit 210, a backhaul communication unit 220, a storage unit 230, and a control unit 240.

The wireless communication unit 210 performs functions for transmitting and receiving a signal through a wireless channel. For example, the wireless communication unit 210 performs a function of conversion between a baseband signal and a bit-stream according to a physical layer standard of a system. For example, in data transmission, the wireless communication unit 210 generates complex symbols by coding and modulating a transmission bit-stream. In addition, in data reception, the wireless communication unit 210 restores a reception bit-stream by demodulating and decoding a baseband signal.

In addition, the wireless communication unit 210 up-converts a baseband signal into a Radio Frequency (RF) signal and thereafter transmits it through an antenna, and down-converts an RF signal received through the antenna into a baseband signal. For this, the wireless communication unit 210 may include a transmission filter, a reception filter, an amplifier, a mixer, an oscillator, a Digital to Analog Converter (DAC), an Analog to Digital Converter (ADC), or the like. In addition, the wireless communication unit 210 may include a plurality of transmission/reception paths. Further, the wireless communication unit 210 may include at least one antenna array constructed of a plurality of antenna elements.

From a hardware aspect, the wireless communication unit 210 may be constructed of a digital unit and an analog unit, and the analog unit may be constructed of a plurality of sub-units according to operating power, operation frequency, or the like. The digital unit may be implemented with at least one processor (e.g., a Digital Signal Processor (DSP)).

The wireless communication unit 210 transmits and receives a signal as described above. Accordingly, the wireless communication unit 210 may be referred to as a transmitter, a receiver, or a transceiver. In addition, in the following description, transmission and reception performed through a wireless channel are used to imply that the aforementioned processing is performed by the wireless communication unit 210.

The backhaul communication unit 220 provides an interface for preforming communication with different nodes in a network. That is, the backhaul communication unit 220 converts a bit-stream transmitted from the base station to a different node, e.g., a different access node, a different base station, an upper node, a core network, or the like, into a physical signal, and converts a physical signal received from the different node into a bit-stream.

The storage unit 230 stores data such as a basic program, application program, configuration information, or the like for an operation of the base station. The storage unit 230 may be constructed of a volatile memory, a non-volatile memory, or a combination of the volatile memory and the non-volatile memory. In addition, the storage unit 230 provides the stored data according to a request of the control unit 240.

The control unit 240 controls overall operations of the base station. For example, the control unit 240 may transmit and receive a signal via the wireless communication unit 210 or the backhaul communication unit 220. In addition, the control unit 240 writes data to the storage unit 230, and reads the data. Further, the control unit 240 may perform functions of a protocol stack required in a communication standard. According to another implementation, the protocol stack may be included in the wireless communication unit 210. For this, the control unit 240 may include at least one processor. According to various embodiments, the control unit 240 may control the base station to perform operations according to various embodiments described below.

Figure 3:
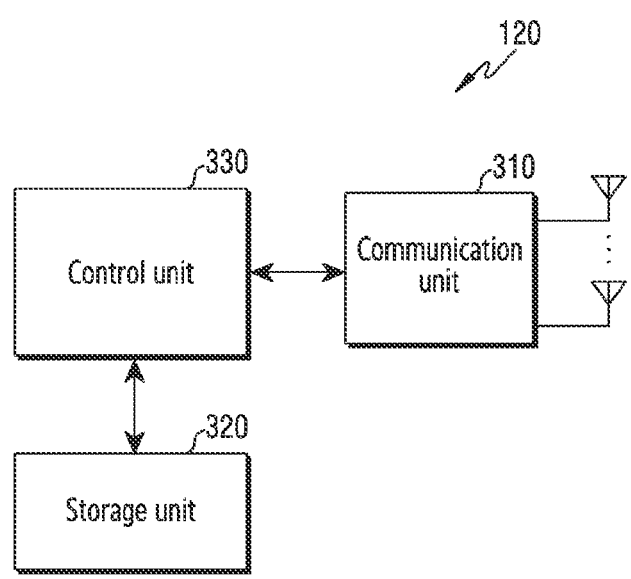
FIG. 3 illustrates a structure of a terminal in a wireless communication system according to various embodiments of the disclosure.

FIG. 3 illustrates a structure of a terminal in a wireless communication system according to various embodiments of the disclosure. The exemplary structure of FIG. 3 may be understood as a structure of the terminal 120. Hereinafter, the term ' . . . unit', ' . . . device', or the like implies a unit of processing at least one function or operation, and may be implemented in hardware or software or in combination of the hardware and the software.

Referring to FIG. 3, the terminal includes a communication unit 310, a storage unit 320, and a control unit 330.

The communication unit 310 performs functions for transmitting and receiving a signal through a wireless channel. For example, the communication unit 310 performs a function of conversion between a baseband signal and a bit-stream according to a physical layer standard of a system. For example, in data transmission, the communication unit 310 generates complex symbols by coding and modulating a transmission bit-stream. In addition, in data reception, the communication unit 310 restores a reception bit-stream by demodulating and decoding a baseband signal. In addition, the communication unit 310 up-converts a baseband signal into a Radio Frequency (RF) signal and thereafter transmits it through an antenna, and down-converts an RF signal received through the antenna into a baseband signal. For example, the communication unit 310 may include a transmission filter, a reception filter, an amplifier, a mixer, an oscillator, a DAC, an ADC, or the like.

In addition, the communication unit 310 may include a plurality of transmission/reception paths. Further, the communication unit 310 may include at least one antenna array constructed of a plurality of antenna elements. From a hardware aspect, the communication unit 310 may be constructed of a digital circuit and an analog circuit (e.g., a Radio Frequency Integrated Circuit (RFIC)). Herein, the digital and the analog circuit may be implemented as one package. In addition, the communication unit 310 may include a plurality of RF chains. Further, the communication unit 310 may perform beamforming.

The communication unit 310 transmits and receives a signal as described above. Accordingly, the communication unit 310 may be referred to as a transmitter, a receiver, or a transceiver. In addition, in the following description, transmission and reception performed through a wireless channel are used to imply that the aforementioned processing is performed by the communication unit 310.

The storage unit 320 stores data such as a basic program, application program, configuration information, or the like for an operation of the terminal. The storage unit 320 may be constructed of a volatile memory, a non-volatile memory, or a combination of the volatile memory and the non-volatile memory. In addition, the storage unit 320 provides the stored data according to a request of the control unit 330.

The control unit 330 controls overall operations of the terminal. For example, the control unit 330 may transmit and receive a signal via the communication unit 310. In addition, the control unit 330 writes data to the storage unit 320, and reads the data. Further, the control unit 330 may perform functions of a protocol stack required in a communication standard. For this, the control unit 330 may include at least one processor or micro-processor, or may be part of the processor. In addition, part of the communication unit 310 and the control unit 330 may be referred to as a Communication Processor (CP). According to various embodiments, the control unit 330 may control the terminal to perform operations according to various embodiments described below.

Figure 4:
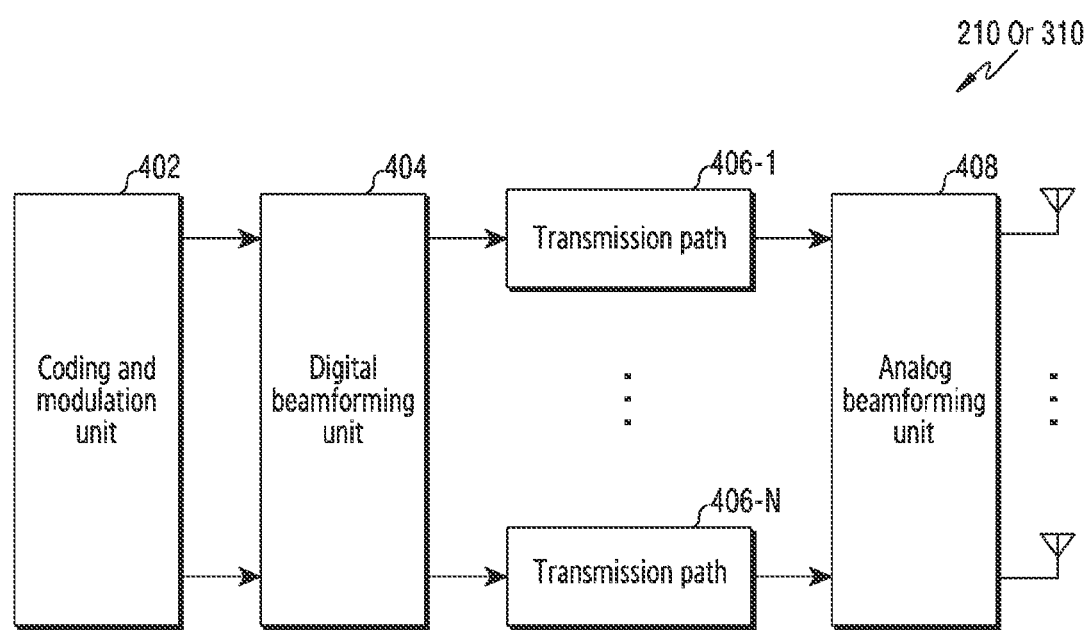
FIG. 4 illustrates a structure of a communication unit in a wireless communication system according to various embodiments of the disclosure.

FIG. 4 illustrates a structure of a communication unit in a wireless communication system according to various embodiments of the disclosure. An example for a detailed structure of the wireless communication unit 210 of FIG. 2 or the communication unit 310 of FIG. 3 is illustrated in FIG. 4. Specifically, components for performing beamforming are exemplified in FIG. 4, as part of the wireless communication unit 210 of FIG. 2 or the communication unit 310 of FIG. 3.

Referring to FIG. 4, the wireless communication unit 210 or the communication unit 310 includes a coding and modulation unit 402, a digital beamforming unit 404, a plurality of transmission paths 406-1 to 406-N, and an analog beamforming unit 408.

The coding and modulation unit 402 performs channel encoding. For the channel encoding, at least one of a Low Density Parity Check (LDPC) code, a convolution code, and a polar code may be used. The coding and modulation unit 402 generates modulation symbols by performing constellation mapping.

The digital beamforming unit 404 performs beamforming on a digital signal (e.g., modulation symbols). For this, the digital beamforming unit 404 multiplies the modulation symbols by beamforming weights. Herein, the beamforming weights are used to change a magnitude and phase of a signal, and may be referred to as a 'precoding matrix', a 'precoder', or the like. The digital beamforming unit 404 outputs modulation symbols subjected to digital beamforming to the plurality of transmission paths 406-1 to 406-N. In this case, according to a Multiple Input Multiple Output (MIMO) transmission scheme, the modulation symbols may be multiplexed, or the same modulation symbols may be provided to the plurality of transmission paths 406-1 to 406-N.

The plurality of transmission paths 406-1 to 406-N convert the digital signals subjected to digital beamforming into an analog signal. For this, each of the plurality of transmission paths 406-1 to 406-N may include an Inverse Fast Fourier Transform (IFFT) calculation unit, a Cyclic Prefix (CP) inserting unit, a DAC, an up-conversion unit. The CP inserting unit is for an Orthogonal Frequency Division Multiplexing (OFDM) scheme, and may be excluded when a different physical layer scheme (e.g., Filter Bank Multi-Carrier (FBMC)) is applied. That is, the plurality of transmission paths 406-1 to 406-N provide an independent signal processing process for a plurality of streams generated through digital beamforming. However, according to an implementation scheme, some of components of the plurality of transmission paths 406-1 to 406-N may be commonly used.

The analog beamforming unit 408 performs beamforming on an analog signal. For this, the digital beamforming unit 404 multiplies the analog signals by beamforming weights. Herein, the beamforming weights are used to change a magnitude and phase of a signal. Specifically, according to a connection structure between the plurality of transmission paths 406-1 to 406-N and antennas, the analog beamforming unit 408 may be configured in various manners. For example, each of the plurality of transmission paths 406-1 to 406-N may be coupled with one antenna array. As another example, the plurality of transmission paths 406-1 to 406-N may be coupled with one antenna array. As another example, the plurality of transmission paths 406-1 to 406-N may be adaptively coupled with one antenna array or coupled with two or more antenna arrays.

A wireless communication system is developed to a broadband wireless communication system which provides a high-speed and high-quality packet data service beyond the early voice-oriented services as in a communication standard, for example, High Speed Packet Access (HSPA), Long Term Evolution (LTE), Evolved Universal Terrestrial Radio Access (E-UTRA), or LTE-advanced (LTE-A) of 3GPP, High Rate Packet Data (HRPD) or Ultra Mobile Broadband (UMB) of 3GPP2, and 802.16e or the like of IEEE. In addition, a 5G or New Radio (NR) communication standard is under development as a 5G wireless communication system.

An NR system adopts an Orthogonal Frequency Division Multiplexing (OFDM) scheme in a DL and a UL. More specifically, a Cyclic-Prefix (CP) OFDM (CP-OFDM) scheme is adopted in the DL, and a Discrete Fourier Transform OFDM Spreading (DFT-S-OFDM) scheme is adopted in the UL in addition to the CP-OFDM. The UL means a radio link through which a terminal transmits data or a control signal to a base station, and the DL means a radio link through which the base station transmits data or a control signal to the terminal. In general, a multiple access scheme assigns and manages a time-frequency resource for carrying and transmitting data or control information for each user such that the resources are avoided from overlapping with each other, that is, such that orthogonality is achieved, thereby identifying data or control information of each user.

The NR system adopts a Hybrid Automatic Repeat Request (HARQ) scheme in which corresponding data is retransmitted by using a physical layer when decoding fails in initial transmission. According to the HARQ scheme, when a receiver fails to decode data accurately, the receiver transmits Negative Acknowledgement (NACK) as information notifying a transmitter of a decoding failure, so that the transmitter retransmits the data by using the physical layer. The receiver may combine the data retransmitted by the transmitter and the previous data of which decoding fails, thereby improving data reception performance. In addition, when the receiver accurately decodes the data, the receiver transmits Acknowledgement (ACK) as information notifying the transmitter of a decoding success, so that the transmitter transmits new data.

Figure 5:
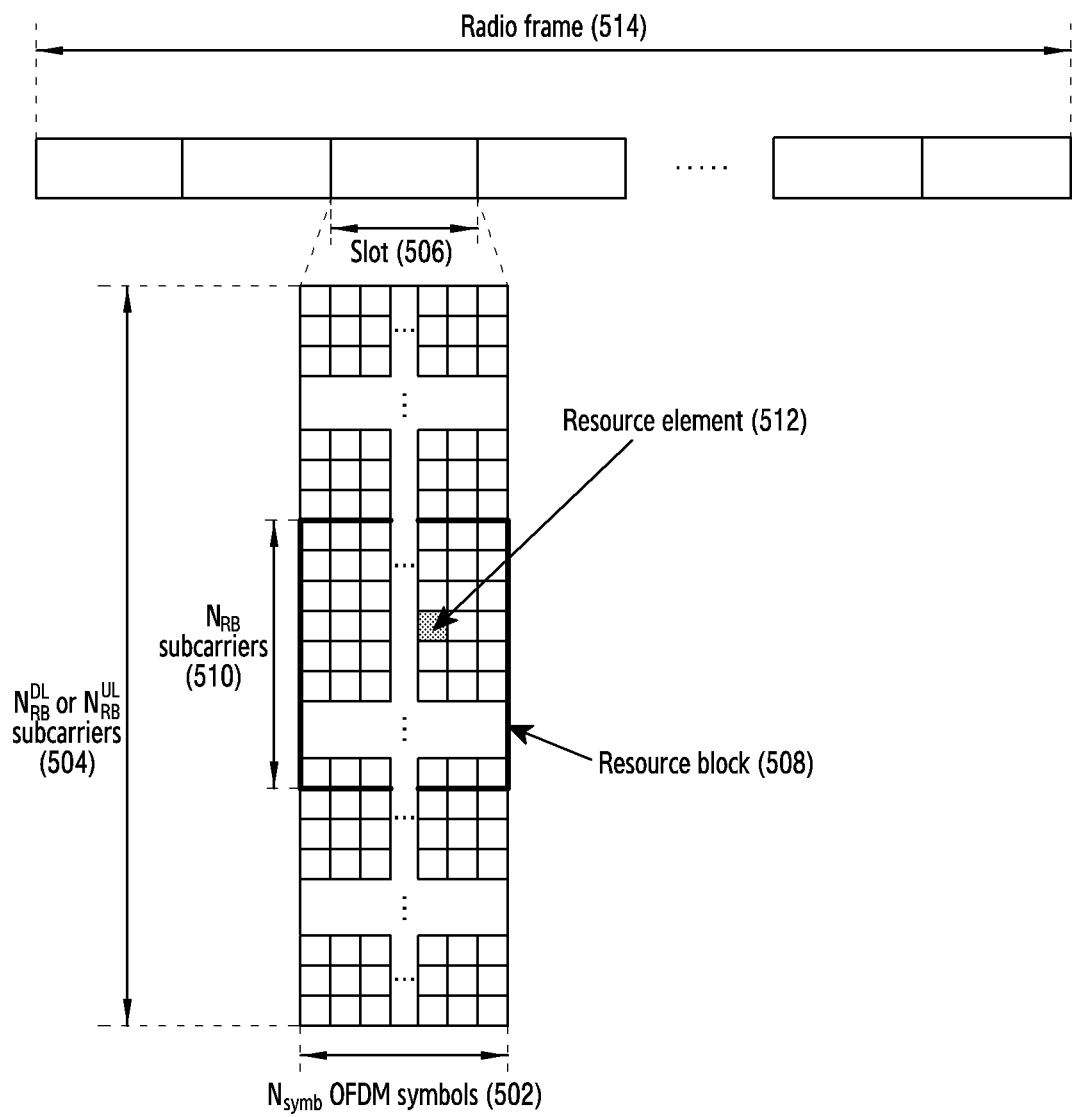
FIG. 5 illustrates a resource configuration in a time-frequency domain in a wireless communication system according to various embodiments of the disclosure.

FIG. 5 illustrates a resource configuration in a time-frequency domain in a wireless communication system according to various embodiments of the disclosure. A basic configuration of the time-frequency domain which is a radio resource region in which data or a control channel is transmitted in a DL or a UL is exemplified in FIG. 5.

In FIG. 5, a horizontal axis represents a time domain, and a vertical axis represents a frequency domain. In the time domain, an OFDM symbol is a minimum unit of transmission, and $N_{symb}$ OFDM symbols 502 are aggregated to constitute one slot 506. A length of a subframe is defined as 1.0 ms, and a length of a radio frame 514 is defined as 10 ms. In the frequency domain, a subcarrier is a minimum unit of transmission, and $N_{BW}$ subcarriers 504 constitute a bandwidth of an entire system transmission bandwidth.

In the time-frequency domain, a Resource Element (RE) 512 is a basic unit of resources, and may be represented by an OFDM symbol index and a subcarrier index. A Resource Block (RB) or Physical Resource Block (PRB) 508 is defined as $N_{symb}$ contiguous OFDM symbols 502 in the time domain and $N_{RB}$ contiguous subcarriers 510 in the frequency domain. Therefore, one RB 508 includes $N_{symb} \times N_{RB}$ REs 512. In general, the RB is a minimum unit of data transmission. In the NR system, $N_{symb}=14$ and $N_{RB}=12$ in general, and New and $N_{RB}$ are in proportion to a bandwidth of a system transmission band. A data rate may increase in proportion to the number of RBs scheduled to a terminal. In the NR system, in case of a Frequency Division Duplex (FDD) system in which a DL and a UL are divided based on a frequency, a DL transmission bandwidth and a UL transmission bandwidth may be different from each other. A channel bandwidth represents a Radio Frequency (RF) bandwidth corresponding to the system transmission bandwidth. Table 1 and Table 2 show part of a correspondence relation of a system transmission bandwidth, Subcarrier Spacing (SCS), and channel bandwidth defined in the NR system at a frequency band below 6 GHz and a frequency band above 6 GHz. For example, in the NR system having a channel bandwidth of 100 MHz with a subcarrier spacing of 30 kHz, a transmission bandwidth is constructed of 273 RBs. In Table 1 and Table 2, N/A may be a bandwidth-subcarrier combination not supported in the NR system.

TABLE 1

| Channel BW [MHz] | SCS | 5 | 10 | 20 | 50 | 80 | 100 |
|---|---|---|---|---|---|---|---|
| Transmission BW $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

| Channel BW [MHz] | SCS | 50 | 100 | 200 | 400 |
|---|---|---|---|---|---|
| Transmission BW $N_{RB}$ | 60 kHz | 66 | 132 | 264 | N/A |
| | 120 kHz | 32 | 66 | 132 | 264 |

In the NR system, scheduling information for DL data or UL data is transferred from a base station to a terminal through Downlink Control information (DCI). The DCI is defined with several formats. According to each format, whether it is a UL grant which is scheduling information for UL data or a DL grant which is scheduling information for DL data, whether it is compact DCI in which a size of control information is small, whether spatial multiplexing using multiple antennas is applied, whether it is DCI for power control, or the like may be determined. For example, a DCI format 1-1 which is scheduling control information for DL data may include at least one of items as shown in Table 3 below.

TABLE 3

| ITEM | CONTENT |
|---|---|
| carrier indicator | It indicates on which frequency carrier it is transmitted. |
| DCI format indicator | It is an indicator for distinguishing whether the corresponding DCI is for downlink or uplink. |
| BWP(bandwidth part) indicator | It indicates in which BWP it is transmitted. |
| frequency domain resource allocation | It indicates an RB in a frequency domain allocated for data transmission. The resource to be expressed is determined according to the system bandwidth and resource allocation method. |
| time domain resource allocation | It indicates in which OFDM symbol in which slot a data-related channel is to be transmitted. |
| VRB-to-PRB mapping | It indicates how to map a virtual RB (VRB) index and a physical RB (PRB) index. |
| MCS(modulation and coding scheme) | It indicates the modulation method and coding rate used for data transmission. That is, it is possible to indicate a coding rate value that can inform TBS and channel coding information together with information on whether it is QPSK, 16QAM, 64QAM, or 256QAM. |
| CBG(codeblock group) transmission information | When CBG retransmission is configured, it indicates which CBG is transmitted. |
| HARQ (process number) | It indicates the number of HARQ process. |
| NDI(new data indicator) | It indicates a redundancy version of HARQ. It indicates whether the HARQ is initial transmission or retransmission. |
| RV(redundancy version) | It indicates a redundancy version of HARQ. |
| PUCCH(physical uplink control channel) TPC(transmit power control command) | It indicates a transmit power control command for the uplink control channel, PUCCH. |

In Table 3, in case of PDSCH transmission, time domain resource assignment may be represented by information on a slot in which a PDSCH is transmitted, a start symbol position S in the slot, and the number L of symbols to which the PDSCH is mapped. Herein, S may be a relative position from the start of the slot, and L may be the number of contiguous symbols. S and L may be determined from a Start and Length Indicator Value (SLIV) defined as shown in Table 4 below.

TABLE 4 if (L−1)≤7 then
  SLIV=14·(L−1)+S
else
  SLIV=14·(14−L+1)+(14−1−S)
where 0<L≤14−S In the NR system, in general, information on a correspondence relation between an SLIV value and a PDSCH or Physical Uplink Shared Channel (PUSCH) mapping type and information on slots in which the PDSCH or the PUSCH is transmitted may be configured in one row through an RRC. Thereafter, the time domain resource assignment of the DCI is used to indicate an index value defined in the configured correspondence relation, and thus the base station may transfer to the terminal the SLIV value, the PDSCH or PUSCH mapping type, and information on the slot in which the PDSCH or the PUSCH is transmitted. In case of the NR system, the PDSCH or PUSCH mapping type is defined as a type A and a type B. In case of the PDSCH or PUSCH mapping type A, a Demodulation Reference Signal (DMRS) symbol starts at a second or third OFDM symbol in the slot. In case of the PDSCH or PUSCH mapping type B, the DMRS symbol starts at a first OFDM symbol of a time domain resource assigned through PUSCH transmission.

Table 5 and Table 6 exemplify S and L combinations supported for each type of the PDSCH and PUSCH.

TABLE 5

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

(Note 1):
S = 3 is applicable only if dmrs-TypeA-Posiition = 3

TABLE 6

| PUSCH mapping type | Normal cyclic prefix | | | Extended cyclic prefix | | |
|---|---|---|---|---|---|---|
| | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 12} | {1, . . . , 12} | {1, . . . , 12} |

The DCI may be subjected to channel coding and modulation and then may be transmitted on a Physical Downlink Control channel (PDCCH) which is a downlink control channel. The PDCCH may also be used to refer to not a channel but control information itself. In general, the DCI is scrambled to a specific Radio Network Temporary Identifier (RNTI) or a UE identifier independently for each UE, is subjected to Cyclic Redundancy Check (CRC) attachment and channel coding, and then is transmitted by being configured with each independent PDCCH. The PDCCH is mapped to a Control Resource Set (CORESET) configured for the UE.

DL data may be transmitted on a PDSCH which is a physical channel dedicated for DL data transmission. The PDSCH may be transmitted after a control channel transmission duration, and scheduling information such as a specific mapping position in a frequency domain, a modulation scheme, or the like is indicated by the DCI transmitted through the PDCCH. Through the MCS in control information constituting the DCI, a base station notifies a modulation scheme applied to the PDSCH to be transmitted to the UE and a size of data (e.g., a Transport Block Size (TBS)) to be transmitted. In an embodiment, the MCS may be constructed of 5 bits or may be constructed of bits more or less than the 5 bits. The TBS corresponds to a size before channel coding for error correction is applied to a Transport Block (TB) which is data to be transmitted by the base station.

In the disclosure, the TB may include a Medium Access Control (MAC) header, a MAC Control Element (CE), at least one MAC Service Data Unit (SDU), and padding bits. Alternatively, the TB may refer to a MAC Protocol Data Unit (PDU) or a unit of data transmitted from the MAC layer to the physical layer.

A modulation scheme supported in the NR system is Quadrature Phase Shift Keying (QPSK), 16 Quadrature Amplitude Modulation (QAM), 64 QAM, and 256 QAM. Each modulation order $Q_m$ may be 2, 4, 6, or 8. That is, 2 bits may be transmitted per symbol in case of the QPSK, 4 bits may be transmitted per symbol in case of the 16 QAM, 6 bits may be transmitted per symbol in case of the 64 QAM, and 8 bits may be transmitted per symbol in case of the 256 QAM.

Figure 6A:
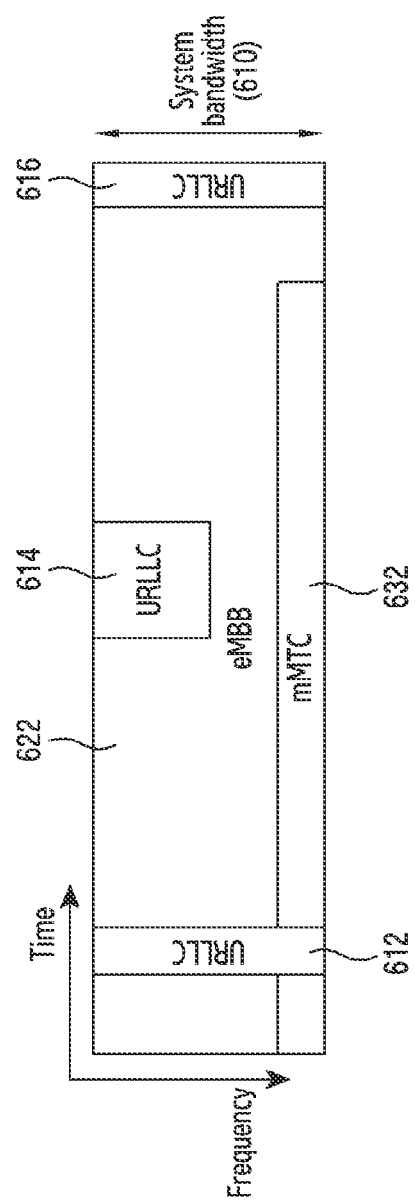
FIG. 6A illustrates an example of assigning per-service data to a frequency-time resource in a wireless communication system according to various embodiments of the disclosure.
Figure 6B:
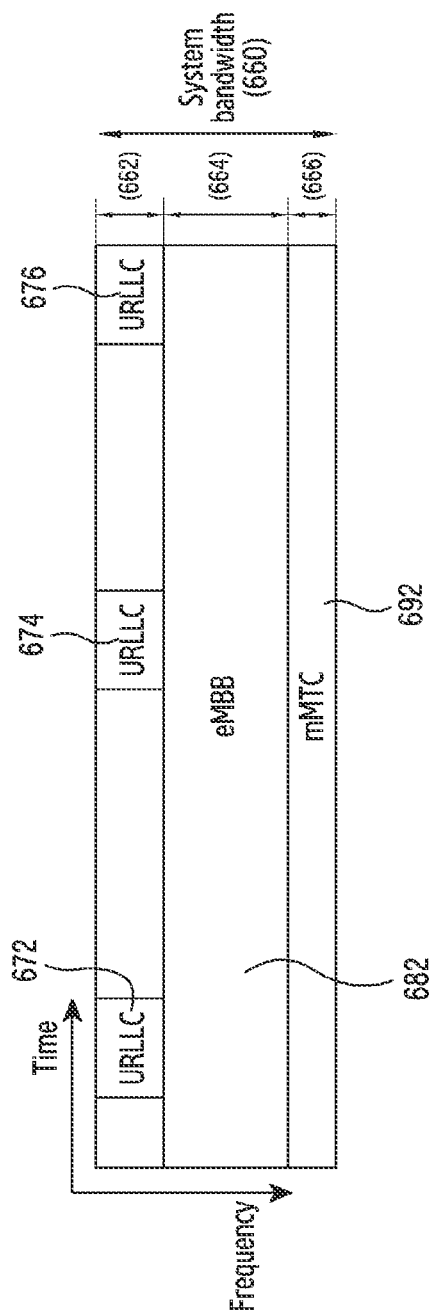
FIG. 6B illustrates another example of assigning per-service data to a frequency-time resource in a wireless communication system according to various embodiments of the disclosure.

In a service aspect, the NR system is designed to allow various services to be multiplexed freely in the time and frequency resources. Optionally, therefore, a waveform/numerology, a reference signal, or the like may be dynamically or freely adjusted. In order to provide an optimal service to the UE in wireless communication, it is important to optimize data transmission through measurement of channel quality and interference. Therefore, it is necessary to accurately measure a channel state. However, unlike 4G communication in which a channel and interference feature does not significantly change depending on the frequency resource, in case of a 5G channel, the channel and interference feature changes significantly depending on a service. Therefore, there is a need to support a subset in terms of a Frequency Resource Group (FRG). Meanwhile, in the NR system, a type of supported services may be classified into enhanced Mobile Broadband (eMBB), massive machine type communications (mMTC), and ultra-reliable and low-latency communications (URLLC). The eMBB is a service aiming at high-speed transmission of high-capacity data. The mMTC is a service aiming at minimization of UE power and access of multiple UEs. The URLLC is a service aiming at high reliability and low latency. Different requirements may be applied depending on the type of services applied to the UE. Examples of resource distribution of each service are as shown in FIG. 6A and FIG. 6B described below. Hereinafter, a method in which frequency and time resources are assigned for information transmission in each system is shown with reference to FIG. 6A and FIG. 6B.

FIG. 6A illustrates an example of assigning per-service data to a frequency-time resource in a wireless communication system according to various embodiments of the disclosure. In case of FIG. 6A, resources are assigned for an eMBB 622, URLLCs 612, 614, and 616, and an mMTC 632 in a system frequency band 610. When data of the URLLCs 612, 614, and 616 is generated while data of the eMBB 622 and data of the mMTC 632 are transmitted by being assigned to a specific frequency band, the data of the URLLCs 612, 614, and 616 may be transmitted by emptying or not transmitting a portion pre-assigned for the eMBB 622 and mMTC 632. Since the URLLC requires to reduce a delay time, a resource for transmitting the data of the URLLCs 612, 614, and 616 may be assigned to some of resources assigned to the eMBB 622. Obviously, if transmission is performed by additionally assigning the URLLCs 612, 614, and 616 to the resource to which the eMBB 622 is assigned, the data of the eMBB 622 may not be transmitted in overlapping frequency-time resources, which may result in a decrease in transmission performance of the data of the eMBB 622. That is, in the above case, transmission of the data of the eMBB 622 may fail due to resource assignment for the URLLCs 612, 614, and 616. The method of FIG. 6A may be referred to as a preemption method.

FIG. 6B illustrates another example of assigning per-service data to a frequency-time resource in a wireless communication system according to various embodiments of the disclosure. An example in which services are provided in respective sub-bands 662, 664, and 666 which are segmented from an entire system frame band 660 is shown in FIG. 6B. Specifically, the sub-band 662 is used for data transmission of URLLCs 672, 674, and 576, the sub-band 664 is used for data transmission of eMBB 682, and the sub-band 666 is used for data transmission of mMTC 692. Information related to a configuration of the sub-bands 662, 664, and 666 may be predetermined, and the information may be transmitted from a base station to a UE through higher signaling. Alternatively, the information related to the sub-bands 662, 664, and 666 may be randomly divided by the base station or a network node to provide services without having to transmit additional sub-band configuration information to the UE.

According to various embodiments, a length of a Transmission Time Interval (TTI) used in URLLC transmission may be shorter than a length of a TTI used in eMBB or mMTC transmission. In addition, a response of URLLC-related information may be transmitted faster than eMBB or mMTC. Accordingly, the UE which uses the URLLC service may transmit/receive information with low latency. Structures of physical layer channels used for respective types to transmit the aforementioned three types of services or data may be different from each other. For example, at least one of the TTI length, a frequency resource assignment unit, a control channel structure, and data mapping method may be different.

Although at least three services and three data types are illustrated above, there may be more types of services and data. In this case, various embodiments described below may also be applied.

Figure 7:
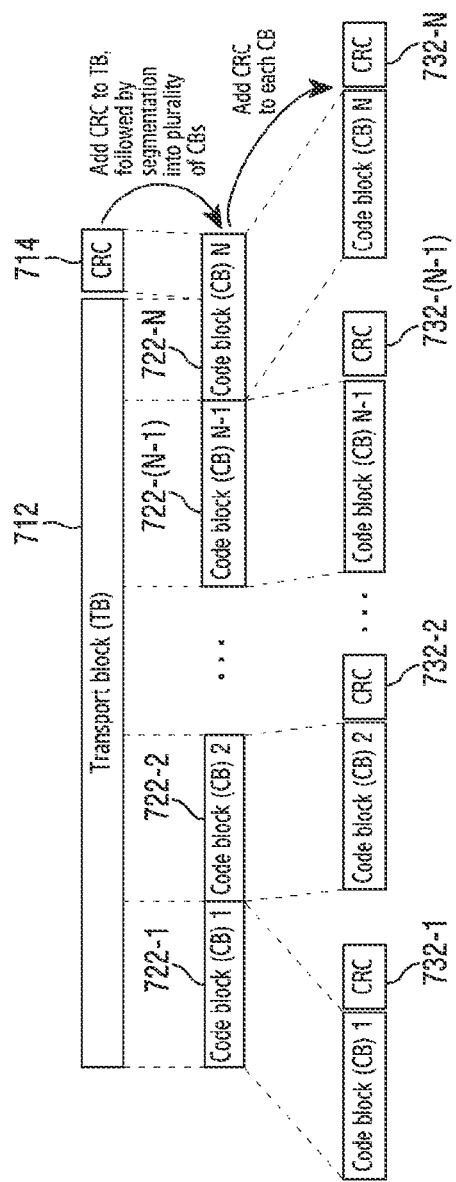
FIG. 7 illustrates a method of encoding data in a wireless communication system according to various embodiments of the disclosure.

FIG. 7 illustrates a method of encoding data in a wireless communication system according to various embodiments of the disclosure. It is exemplified in FIG. 7 that one TB is segmented into several Code Blocks (CBs), and CRC is added thereto.

Referring to FIG. 7, a CRC 714 may be added to a rear or front end of one TB 712 to be transmitted in a UL or a DL. The CRC 714 may have 16 bits, 24 bits, or a predetermined number of bits, or may have a variable number of bits according to a channel condition or the like, and may be used in a receiver to determine whether channel coding is successful. A block to which the TB 712 and CRC 714 are added is segmented into a plurality of CBs 722-1, 722-2, 722-(N-1), and 722-N. The block may be segmented with a predefined size of the CB. In this case, the last CB 722-N may be smaller in size than other CBs, or may be configured to have the same length as other CBs by adding 0, a random value, or 1. CRCs 732-1, 732-2, 732-(N-1), and 732-N may be added to the respective segmented CBs. The CRCs 732-1, 732-2, 732-(N-1), and 732-N may have 16 bits, 24 bits, or a predetermined number of bits, and may be used in the receiver to determine whether channel coding is successful.

The TB 712 and a cyclic generator polynomial may be used to generate the CRC 714. The cyclic generator polynomial may be defined variously. For example, if a cyclic generator polynomial for a 24-bit CRC is assumed as $g_{CRC24A}(D)=D^{24}+D^{23}+D^{18}+D^{17}+D^{14}+D^{11}+D^{10}+D^{7}+D^{6}+D^{5}+D^{4}+D^{3}+D+1$ and if L=24, then, for TB data $a_0, a_1, a_2, a_3, \ldots, a_{A-1}$, a CRC $p_1, p_2, \ldots, p_{L-1}$ may be given by a value in which a remainder of $a_0 D^{A+23}+a_1 D^{A+22}+\ldots+a_{A-1}D^{24}+p_0 D^{23}+p_1 D^{22}+\ldots+p_{22}D^{1}+p_{23}$ divided by $g_{CRC24A}(D)$ is 0. Although it is described in the above example that the CRC length L is 24, the length L may be defined variously such as 12, 16, 24, 32, 40, 48, 64, or the like.

After the CRC is added to the TB as described above, a sum of the TB and the CRC is segmented into N CBs 722-1, 722-2, 722-(N-1), and 722-N. The CRCs 732-1, 732-2, 732-(N-1), and 732-N are respectively added to CBs 722-1, 722-2, 722-(N-1), and 722-N. The CRC added to each CB may be generated based on a CRC having a length different from when the CRC added to the TB is generated or based on another cyclic generation polynomial. However, according to another embodiment, the CRC 714 added to the TB and the CRCs 732-1, 732-2, 732-(N-1), and 732-N added to the CBs 722-1, 722-2, 722-(N-1), and 722-N may be omitted according to a type of a channel code to be applied to the CB. For example, when not a turbo code but a Low Density Parity Code (LDPC) code is applied to the CB, the CRCs 732-1, 732-2, 732-(N-1), and 732-N added to respective CBs may be omitted. However, even if the LDPC is applied, the CRCs 732-1, 732-2, 732-(N-1), and 732-N may be added to the CBs 732-1, 732-2, 732-(N-1), 732-N. In addition, even if a polar code is used, the CRC may be added or omitted.

As shown in FIG. 7, in the TB, a maximum length of one CB is determined according to a type of channel coding to be applied, and a CRC to be added to the TB is segmented into a CB according to the maximum length of the CB. In the conventional LTE system, a CRC dedicated for a CB is added to a segmented CB, and a data bit and CRC of the CB are encoded with a channel code. Therefore, coded bits are determined, and for each of the coded bits, the number of bits to be subjected to rate matching is determined in a pre-agreed manner.

Figure 8:
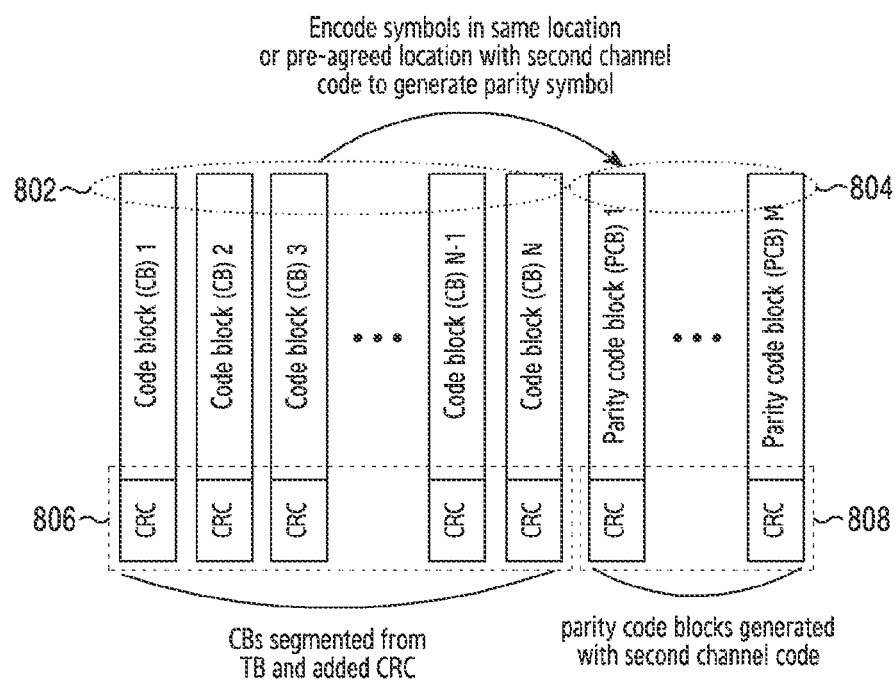
FIG. 8 illustrates an example of using an outer code in a wireless communication system according to various embodiments of the disclosure.
Figure 9A:
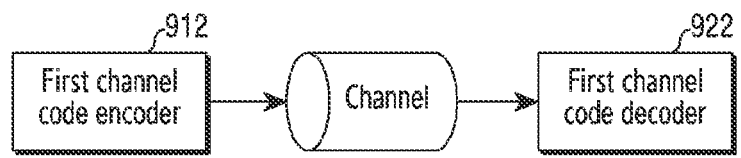
FIGS. 9A and 9B illustrate a structure of a transmitter and receiver using an outer code in a wireless communication system according to various embodiments of the disclosure.
Figure 9B:
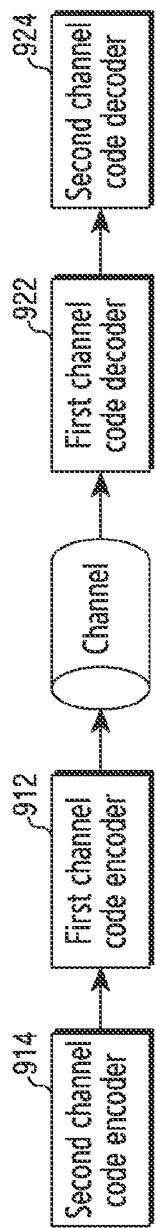

FIG. 8 illustrates an example of using an outer code in a wireless communication system according to various embodiments of the disclosure. FIG. 9A and FIG. 9B illustrate a structure of a transmitter and receiver using an outer code in a wireless communication system according to various embodiments of the disclosure.

Referring to FIG. 8, one TB is segmented into a plurality of CBs, and then bits or symbols 802 which are in the same location in each CB are encoded using a second channel code. Accordingly, parity bits or symbols 804 are generated. Thereafter, CRCs 806 and 806 may be added to the respective CBs and parity CBs generated by second channel code encoding.

Whether to add the CRCs 806 and 808 may vary depending on a type of a channel code. For example, when a turbo code is used as a first channel code, the CRCs 806 and 808 may be added. In the disclosure, a convolution code, an LDPC code, a turbo code, a polar code, or the like may be used as the first channel code. However, this is only one example, and various channel codes may be applied as the first channel code in the disclosure. In the disclosure, for example, a Reed-Solomon code, a BCH code, a Raptor code, a parity bit generation code, or the like may be used as a second channel code. However, this is only one example, and various channel code may also be used as the second channel code.

Referring to FIG. 9A, when an outer code is not used, a first channel code encoder 912 and a first channel code decoder 922 are respectively included in a transmitter and a receiver, and a second channel code encoder 914 and a second channel code decoder 924 may not be included. When the outer code is not used, the first channel code encoder 912 and the first channel code decoder 922 may be configured in the same manner as in a case of using the outer code to be described below.

Referring to FIG. 9B, when the outer code is used, data to be transmitted may pass through the second channel code encoder 914. A bit or symbol which has passed through the second channel code encoder 924 may pass through the first channel code encoder 912. When the channel-coded symbols pass through the channel 902 and are received in the receiver, the receiver may perform a decoding operation by sequentially using the first channel code decoder 922 and the second channel code decoder 924, based on a received signal. The first channel code decoder 922 and the second channel code decoder 924 may perform operations corresponding to the first channel code encoder 912 and the second channel code encoder 914, respectively.

Figure 10:
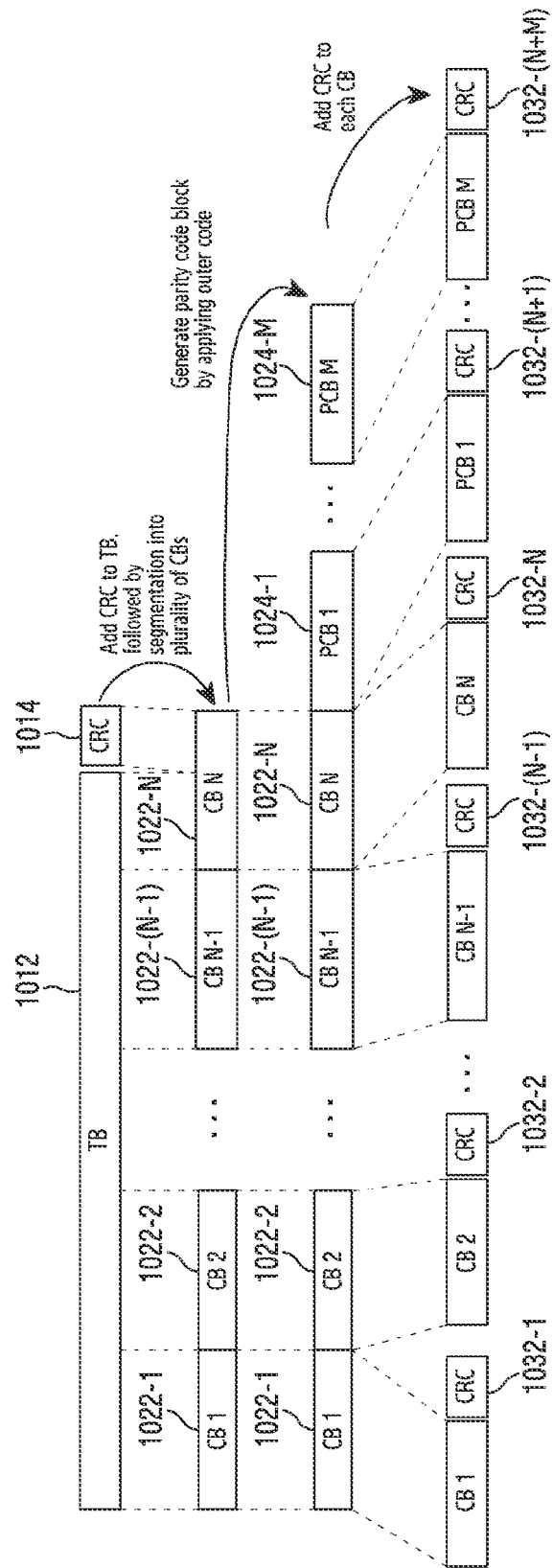
FIG. 10 illustrates an example of a process in which one Transport Block (TB) is encoded in a wireless communication system according to various embodiments of the disclosure.

FIG. 10 illustrates an example of a process in which one TB is encoded in a wireless communication system according to various embodiments of the disclosure. In an example of FIG. 10, a second channel code or an outer code is applied to a plurality of TBs segmented from one TB to generate one or more parity CBs.

Referring to FIG. 10, one TB 1012 may be segmented into at least one CB or a plurality of CBs 1022-1 to 1022-N after a CRC 1014 is added thereto. In this case, when only one CB is generated according to a size of the TB 1012, the CRC may not be added to the CB. When the outer code is applied to the plurality of CBs 1022-1 to 1022-N, Parity CBs (PCBs) 1024-1 to 1024-M may be generated. When the outer code is used, the PCBs 1024-1 to 1024-M may be located after the last CB 1022-M. After performing encoding using the outer code, the CRCs 1032-1 to 1032-(N+M) may be added. Thereafter, the CBs and PCBs may be encoded together with the CRC according to a channel code.

In a wireless communication system according to various embodiments, a TB size may be calculated through the following steps.

Step 1: $N_{RE}'$ which is the number of REs assigned to PDSCH mapping in one PRB in an assignment resource is calculated. $N_{RE}'$ may be calculated by $N_{RE}'=N_{SC}^{RB} \cdot N_{symb}^{sh} - N_{DMRS}^{PRB} - N_{oh}^{PRB}$. Herein, $N_{sc}^{RB}$ denotes the number (e.g., 12) of subcarriers included in one RB, $N_{symb}^{sh}$ denotes the number of OFDM symbols assigned to the PDSCH, $N_{DMRS}^{PRB}$ denotes the number of REs in one PRB, occupied by a Demodulation Reference Signal (DMRS) of the same Code Division Multiplexing (CDM) group, and $N_{oh}^{PRB}$ denotes the number (e.g., given by one of 0, 6, 12, and 18) of REs occupied by an overhead in one PRB configured by higher signaling. Thereafter, the total number $N_{RE}$ of REs assigned to the PDSCH may be calculated. $N_{RE}$ is calculated by $N_{RE}=\min(156, N_{RE}') \cdot n_{PRB} \cdot n_{PRB}$ denotes the number of PRBs assigned to a UE.

Step 2: The number $N_{info}$ of temporary information bits may be calculated by $N_{info}=N_{RE} \cdot R \cdot Q_m \cdot v$. Herein, R denotes a code rate, Qm denotes a modulation order, and v denotes the number of assigned layers. The code rate and the modulation order may be transmitted by using a pre-defined correspondence relation with an MCS field included in control information. If $N_{info} \leq 3824$, the TBS may be calculated according to step 3 described below, and otherwise, may be calculated according to step 4 described below.

Step 3: $N_{info}'$ may be calculated such as $$N_{info}' = \max\left(24, 2^n \cdot \left\lfloor \frac{N_{info}}{2^n} \right\rfloor\right) \text{ and}$$

$$n = \max(3, \lfloor \log_2(N_{info}) \rfloor - 6).$$

Subsequently, the TBS may be given by a value closest to $N_{info}'$ among values not less than $N_{info}'$ in Table 7 below.

TABLE 7

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |

TABLE 7-continued

| Index | TBS |
|---|---|
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: $N_{info}'$ may be calculated by $$N_{info}' = \max\left(3840, 2^n \times \text{round}\left(\frac{N_{info} - 24}{2^n}\right)\right) \text{ and }$$

$$n = \lfloor \log_2(N_{info} - 24) \rfloor - 5.$$

Subsequently, the TBS may be determined through $N_{info}'$ and a pseudo-code as shown in Table 8 below.

TABLE 8 if $R \leq 1/4$ $$TBS = 8 * C * \left\lceil \frac{N_{info}' + 24}{8 * C} \right\rceil - 24, \text{ where } C = \left\lceil \frac{N_{info}' + 24}{3816} \right\rceil$$

else
  if $N_{info}' > 8424$ $$TBS = 8 * C * \left\lceil \frac{N_{info}' + 24}{8 * C} \right\rceil - 24, \text{ where } C = \left\lceil \frac{N_{info}' + 24}{8424} \right\rceil$$

else $$TBS = 8 * \left\lceil \frac{N_{info}' + 24}{8} \right\rceil - 24$$

end if
end if

When one CB is input to an LDPC encoder, parity bits may be added and output. In this case, a size of parity bits may vary depending on an LDPC base graph. All parity bits generated by LDPC coding may be transmitted entirely or partially according to a scheme of rate matching. A scheme in which all parity bits generated by the LDPC coding are processed to be transferable is referred to as 'Full Buffer Rate Matching (FBRM)', and a scheme in which the number of transferrable parity bits is limited is referred to as 'Limited Buffer Rate Matching (LBRM)'. When a resource is assigned for data transmission, an output of an LDPC encoder is input to a circular buffer, and bits of the buffer are transmitted repeatedly as much as assigned resources.

In case of an FBRM scheme, $N_{cb}=N$ when Ncb denotes a length of the circular buffer, and N denotes the number of all parity bits generated by LDPC coding. In case of an LBRM scheme, it may be determined that $$N_{cb} = \min(N, N_{ref}), N_{ref} = \left\lfloor \frac{TBS_{LBRM}}{C \cdot R_{LBRM}} \right\rfloor, \text{ and } R_{LBRM} = 2/3.$$

The aforementioned scheme of determining the TBS may be used to determine $TBS_{LBRM}$. In a UL case, when a value of a parameter maxMIMO-Layers is configured in higher layer signaling PUSCH-ServingCellConfig of a corresponding cell, the maximum number of layers for one TB is assumed as that value, otherwise, when a value of a parameter maxRank is configured in pusch-Config, it is assumed as that value, and otherwise, it may be assumed as the maximum number of layers supported by the UE in the corresponding cell. A modulation order may be assumed as a maximum modulation order which is set to the UE in the corresponding cell, or if it is not set, may be assumed as 64-QAM. A code rate may be assumed as a maximum code rate, i.e., 948/1024. $N_{RE}$ may be assumed as $N_{RE}=156 \cdot n_{PRB} \cdot n_{PRB}$ may be assumed as $n_{PRB}=N_{PRB,LBRM} \cdot n_{PRB,LBRM}$ may be defined as shown in Table 9 below.

TABLE 9

| Maximum number ch PRBs across all configured BWPs of a carrier | $n_{PRB, LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In a DL case, when a value of a parameter maxMIMO-Layers is configured in higher layer signaling PDSCH-ServingCellConfig of a corresponding cell, the maximum number of layers for one TB may be assumed as that value, and otherwise, it may be assumed as a smaller value resulting from comparison between the maximum number of layers supported by the UE in a corresponding cell and a predetermined value (e.g., 4).

In a wireless communication system according to various embodiments, a maximum data rate supported by the UE may be determined through Equation 1 below.

$$\text{data rate (in } Mbps\text{)} = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot (1 - OH^{(j)}) \right)$$

[Equation 1]

In Equation 1, J denotes the number of carriers aggregated through Carrier Aggregation (CA), Rmax=948/1024, $v_{Layers}^{(j)}$ Layers denotes the maximum number of layers of a carrier of an index j (this value may be indicated by a higher layer parameter maxNumberMIMO-LayersPDSCH in a DL case, and by a maximum value of values corresponding to maxNumberMIMO-LayersCB-PUSCH and maxNumberMIMO-LayersNonCB-PUSCH in a UL case), $Q_m^{(j)}$ denotes a maximum modulation order of the carrier of the index j, $f^{(j)}$ denotes a scaling factor of the carrier of the index j, and μ denotes a subcarrier spacing. $f^{(j)}$ is one of values 1, 0.8, 0.75, and 0.4, and may be reported by the UE. μ may be given as shown in Table 10 below.

TABLE 10

| | Δf = $2^\mu$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Herein, $T_s^\mu$ is an average OFDM symbol length, and may be calculated by $$T_s^\mu = \frac{10^{-3}}{14 \cdot 2^\mu} \cdot N_{PRB}^{BW(j),\mu}$$

is the maximum number of RBs at $BW^{(j)}$ $OH^{(j)}$ is an overhead value, which may be given by 0.14 and 0.18 respectively in DL and UL cases of FR1 (e.g., a band below 6 GHz or 7.125 GHz), and may be given by 0.80 and 0.10 respectively in DL and UL cases of FR2 (e.g., a band above 6 GHz or 7.125 GHz). According to Equation 1, in a cell having a frequency bandwidth of 100 MHz with a subcarrier spacing of 30 kHz, a maximum data rate in the DL may be calculated as shown in Table 11 below.

TABLE 11

| $f^{(j)}$ | $v_{layers}^{(j)}$ | $Q_{nt}^{(j)}$ | Rmax | $N_{PRB}^{BW(j),\mu}$ | $T_s^\mu$ | $OH^{(j)}$ | data rate |
|---|---|---|---|---|---|---|---|
| 1 | 4 | 8 | 0.92578125 | 273 | 3.57143E–05 | 0.14 | 2337.0 |
| 0.8 | 4 | 8 | 0.92578125 | 273 | 3.57143E–05 | 0.14 | 1869.6 |
| 0.75 | 4 | 8 | 0.92578125 | 273 | 3.57143E–05 | 0.14 | 1752.8 |
| 0.4 | 4 | 8 | 0.92578125 | 273 | 3.57143E–05 | 0.14 | 934.8 |

On the other hand, a real data rate which may be measured by the UE in real data transmission may be a value obtained by dividing an amount of data by a data transmission time. This may be a value obtained by dividing a TB Size (TBS) in case of 1-TB transmission or a sum of TBSs in case of 2-TB transmission by a TTI length. For example, in a cell having a frequency bandwidth of 100 MHz with a subcarrier spacing of 30 kHz, a maximum real data rate in the DL may be determined as shown in Table 12 below according to the number of assigned PDSCH symbols.

TABLE 12

| $N_{symb}^{ab}$ | $N_{DMRS}^{PRB}$ | $N_{RB}$ | $N_{RE}$ | $N_{info}$ | n | $N'_{info}$ | C | TBS | TTI length (mms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.43 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,0952 | 152 | 1,277,992 | 0.500000 | 2,555.98 |

It is possible to identify the maximum data rate supported by the UE through Table 11, and it is possible to identify a real data rate according to an assigned TB through Table 12. In this case, according to scheduling information, the real data rate may be greater than the maximum data rate.

In a wireless communication system, in particular, in an NR system, the data rate supportable by the UE may be mutually agreed between the base station and the UE. This may be calculated by using a maximum frequency band, a maximum modulation order, the maximum number of layers, or the like supported by the UE. However, the calculated data rate may be different from a value calculated from a Transport Block Size (TBS) and Transmission Time Interval (TTI) length used in real data transmission. Accordingly, a TBS greater than a value corresponding to the data rate supported by the UE may be assigned to the UE. To prevent this, a schedulable TBS may be restricted according to the data rate supported by the UE. It may be necessary to minimize such a case, and an operation of the UE may need to be defined in this case. In addition, when LBRM is applied in a communication system currently defined in NR, $TBS_{LBRM}$ is determined based on the number of layers, a rank, or the like supported by the UE. Since this process is inefficient or a parameter configuration or the like is ambiguous, there is a problem in that it is difficult to reliably apply the LBRM in the base station or the UE. Hereinafter, various embodiments are described in the disclosure to solve this problem.

Figure 11:
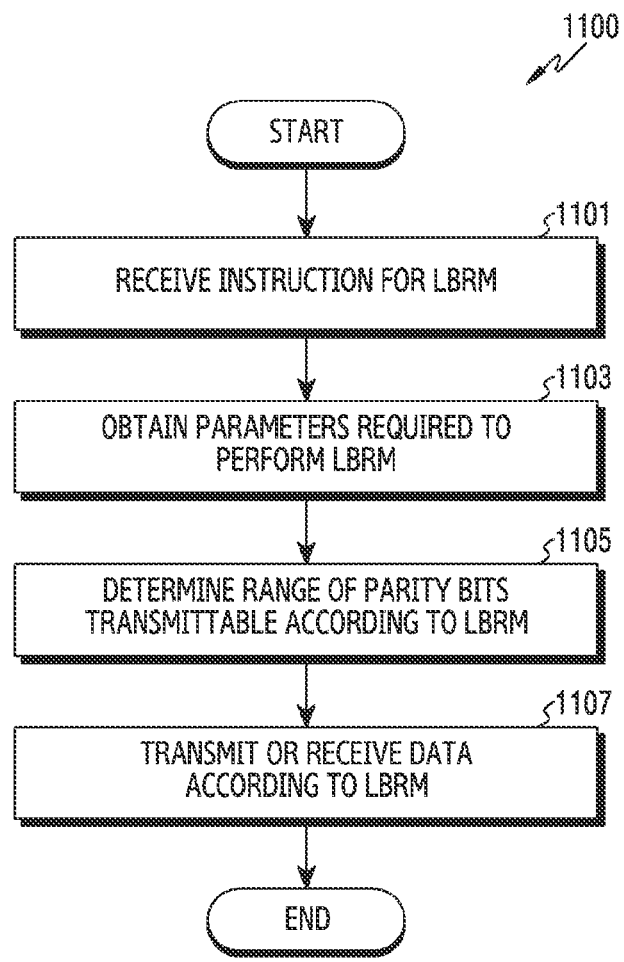
FIG. 11 illustrates a flowchart of a User Equipment (UE) for transmitting or receiving data in a wireless communication system according to various embodiments of the disclosure.

FIG. 11 illustrates a flowchart of a UE for transmitting or receiving data in a wireless communication system according to various embodiments of the disclosure. A method of operating the UE 120 is exemplified in FIG. 11.

Referring to FIG. 11, in step 1101, the UE receives an instruction for LBRM. The instruction for the LBRM may be included in information for configuring a channel (e.g., PUSCH or PDSCH) used to transmit or receive data. For example, the information for configuring the channel may be received through an RRC message. For example, the LBRM may be enabled by a parameter 'rateMatching' in PUSCH-ServingCellConfig.

In step S1103, the UE obtains parameters required to perform the LBRM. The parameters for performing the LBRM may include a code rate and/or at least one parameter for calculating a TB size. In addition, the parameter for calculating the TB size may include the maximum number of layers and/or a band combination applied to perform CA.

Figure 12:
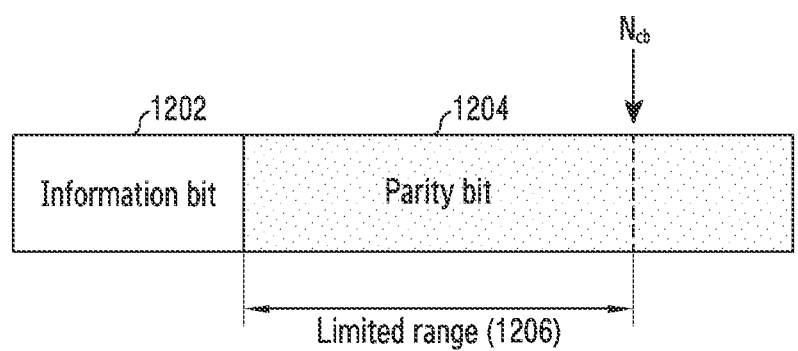
FIG. 12 illustrates an example of a range of transmittable bits based on Limited Buffer Rate Matching (LBRM) in a wireless communication system according to various embodiments of the disclosure.

In step 1105, the UE determines a range of parity bits transmittable according to the LBRM. The LBRM is a technique in which some of parity bits are treated as transmittable bits, and at least one buffer of the transmittable bits is transmitted through a channel. For example, as shown in FIG. 12, bits in a limited range 1206 indicated by Ncb among parity bits 1204 generated from information bits 1202 are transmittable, and the remaining bits are not transmitted even if a Redundancy Version (RV) is changed. Therefore, the UE may determine a specific range, to which bits to be treated as transmittable or receivable bits belong, among the parity bits. Treating as the transmittable bits may be achieved by inputting the bits to a circular buffer.

In step 1107, the UE transmits or receives data according to the LBRM. In other words, when performing encoding or decoding, the UE performs the encoding or decoding by considering parity bits in the limited range. In case of DL communication, the UE may manage a buffer having a size corresponding to the limited range to buffer the received data. In case of UL communication, the UE may generate parity bits by encoding an information bit, and may allow transmission data to include at least one parity bit selected in the limited range among the generated parity bits.

As descried with reference to FIG. 11, the UE may perform the LBRM. To perform the LBRM, the UE determines the limited range for the parity bits. To this end, there is a need to determine a parameter (e.g., a band combination or the maximum number of layers, applied for a CA operation) required to determine the limited range. Hereinafter, embodiments for determining the parameter required to determine the limited range will be described.

Method for Determining Band Combination

A UE reports information on UE capability to a base station while accessing the base station. The capability may enable reporting of parameters (e.g., the maximum number of layers, a maximum modulation order, a maximum frequency bandwidth, whether to support a specific technique, etc.) supportable by the UE to the base station. To this end, the base station may instruct the UE to provide information on the capability by transmitting a UE capability enquiry message, and the UE may provide information on the capability by transmitting a UE capability information message. The information on the UE capability may be transferred to the base station through higher signaling such as RRC signaling or the like, and the base station may store the information on specific UE capability. The UE capability information stored in the base station may be used by the base station to directly recognize the UE capability when the UE accesses the same base station at a later time.

The UE may transmit information on a frequency band supported by the UE to the base station, as part of the UE capability information. The information on the supported frequency band may imply a single frequency band or combinations of frequency bands simultaneously supported. The base station and the UE may exchange signaling information as shown in Table 13 below to transfer information of the frequency band or band combination supported by the UE. The signaling information as shown in Table 13 may be referred to as 'BandCombinationList information element'.

TABLE 13

```
-- ASN1START
-- TAG-BANDCOMBINATIONLIST-START
BandCombinationList ::=                   SEQUENCE (SIZE
(1..maxBandComb)) OF BandCombination
BandCombinationList-v1540 ::=             SEQUENCE (SIZE
(1..maxBandComb)) OF BandCombination-v1540
BandCombinationList-v1550 ::=             SEQUENCE (SIZE
(1..maxBandComb)) OF BandCombmation-v1550
BandCombination ::=                       SEQUENCE {
   bandList                               SEQUENCE (SIZE
(1..maxSimultaneousBands)) OF BandParameters,
   featureSetCombination                  FeatureSetCombinationId,
   ca-ParametersEUTRA
OPTIONAL,
   ca-ParametersNR
OPTIONAL,
   mrdc-Parameters                        MRDC-Parameters
OPTIONAL,
   supportedBandwidthCombinationSet       BIT STRING (SIZE (1 ..32))
OPTIONAL,
   powerClass-v1530                       ENUMERATED {pc2}
OPTIONAL
}
BandCombination-v1540::=                  SEQUENCE {
   bandList-v1540                         SEQUENCE (SIZE
(1..maxSimultaneousBands)) OF BandParameters-v1540,
   ca-ParametersNR-v1540
OPTIONAL
}
BandCombination-v1550 ::=                 SEQUENCE {
   ca-ParametersNR-v1550
}
BandParameters ::=                        CHOICE {
   eutra                                  SEQUENCE {
      bandEUTRA
FreqBandIndicatorEUTRA,
      ca-BandwidthClassDL-EUTRA                      CA-
BandwidthClassEUTRA           OPTIONAL,
      ca-BandwidthClassUL-EUTRA                      CA-
BandwidthClassEUTRA           OPTIONAL
   },
   nr                                                SEQUENCE{
      bandNR                                         FreqBandIndicatorNR,
      ca-BandwidthClassDL-NR                         CA-BandwidthClassNR
OPTIONAL,
      ca-BandwidthClassUL-NR                         CA-BandwidthClassNR
OPTIONAL
   }
}
BandParameters-v1540 ::=              SEQUENCE {
   srs-CarrierSwitch                  CHOICE {
      nr                                             SEQUENCE {
         srs-SwitchingTimesListNR                    SEQUENCE (SIZE,
(1..maxSimultaneousBands)) OF SRS-SwitchingTimeNR
      },
      eutra                                          SEQUENCE {
         srs-SwitchingTimesListEUTRA                 SEQUENCE (SIZE
(1..maxSimultaneousBands)) OF SRS-SwitchingTimeEUTRA
      }
   }
OPTIONAL,
   srs-TxSwitch-v1540                 SEQUENCE {
      supportedSRS-TxPortSwitch       ENUMERATED {t1r2, t1r4,
t2r4, t1r4-t2r4, t1r1, t2r2, t4r4, notSupported},
      txSwitchImpactToRx                             INTEGER (1..32)
OPTIONAL,
      txSwitchWithAnotherBand                        INTEGER (1..32)
OPTIONAL
   }
```

TABLE 13-continued

```
OPTIONAL
}
-- TAG-BANDCOMBINATIONLIST-STOP
-- ASN1STOP
```

Information as shown in Table 13 may be transferred through an RRC layer, and may be information on a Band Combination (BC) supported by the UE. For reference, in Table 13 above, version information such as v1540 may be modified or added such as v1550, v1560, . . . or v16** according to a supporting system. The base station configures information on Carrier Aggregation (CA), based on the received UE capability. For example, carriers configured for CA to the UE by the base station shall be carriers included in a frequency band reported by the UE to the base station as supportable bands.

TABLE 14

|     |            | FR1 - band 1 |     |     |     | FR2 - band 3 |     |     |     |
|-----|------------|-----|-----|-----|-----|-----|-----|-----|-----|
|     |            | CC1 | CC2 | CC3 | CC4 | CC1 | CC2 | CC3 | CC4 |
| BC1 | max layers | 8   | 8   | 8   | 8   | 2   | 2   | 2   | 2   |

Table 14 is an example of a case where the UE reports to the base station that it is possible to perform transmission/reception by aggregating one band (band 1) of a frequency range 1 (FR1) and one band (band 3) of a frequency range 2 (FR2), as an example of UE capability for one band combination reported by the UE to the base station. For reference, in general, the frequency range is represented by the FR1 when a frequency band is low and represented by the FR2 when the frequency band is high, but the disclosure is not necessarily limited thereto. Referring to Table 14, the UE may perform CA by using some or all of four CCs in the band 1, and may also perform CA together by using some or all of four CCs additionally in the band 3. In addition, the UE may receive data by using up to 8 layers per CC in each carrier of the band 1, and may receive data by using up to 2 layers per CC in the band 3.

TABLE 15

|     |            | FR1 - band 1 |     |     |     | FR1 - band 2 |     |     |     | FR2 - band 3 |     |     |     |
|-----|------------|-----|-----|-----|-----|-----|-----|-----|-----|-----|-----|-----|-----|
|     |            | CC1 | CC2 | CC3 | CC4 | CC1 | CC2 | CC3 | CC4 | CC1 | CC2 | CC3 | CC4 |
| BC2 | max layers | 4   | 4   | 4   | 4   | 4   | 4   | 4   | 4   | 2   | 2   | 2   | 2   |

Figure 15:
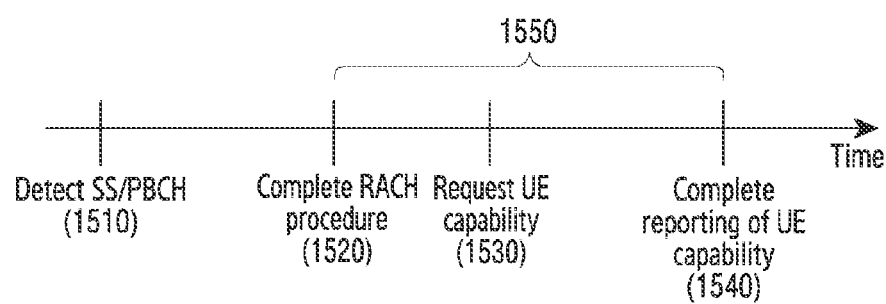
FIG. 15 illustrates an example of an interval in which an ambiguity of a parameter required to perform LBRM occurs in a wireless communication system according to various embodiments of the disclosure.

Table 15 is an example of a case where the UE reports to the base station that it is possible to perform transmission/reception by aggregating one band (band 1) of a frequency range 1 (FR1), another band (band 2) different from the FR1, and one band (band 3) of a frequency range 2 (FR2), as another example of UE capability for one band combination reported by the UE to the base station. Referring to FIG. 15, the UE may perform CA by using some or all of four CCs in the band 1, may perform CA by using some or all of four CCs in the band 2, and may perform CA together by using some or all of four CCs in the band 3. In addition, the UE may receive data by using up to 4 layers per CC in the bands 1 and 2, and may receive data by using up to 2 layers per CC in the band 3.

When the base station configures one or more CCs for CA to the UE, there is a case where the UE may not know which band combination is assumed, used, or applied by the base station to configure the CCs. For example, when the UE transmits information on the band combination as shown in Table 14 and Table 15 above to the base station, if the base station configures the CC1 and CC2 of the band 1 for CA, it is difficult for the UE to identify which band combination is applied in Table 14 and Table 15. This is because both the band combination of Table 14 and the band combination of Table 15 include the CC1 and CC2 of the band 1. In this case, the UE is not able to determine whether the maximum number of layers supportable in the CC1 and CC2 of the band 1 is 8 or 4.

The following embodiments may be used to solve a problem in that the band combination applied or assumed by the base station is not matched in the base station and the UE.

Transmission of Indicator or Instruction for Band Combination

According to an embodiment, an indicator or instruction for a band combination applied or assumed for a UE by a base station may be provided. The base station notifies the UE of an RRC configuration or higher signaling configuration indicating which band combination is applied or assumed for the UE. For example, when the UE reports UE capability to the base station to notify that both a band combination 1 (e.g., Table 14) and a band combination 2 (e.g., Table 15) are possible, the base station may notify the UE of which band combination is applied or assumed between the band combination 1 and the band combination 2. Information indicating the band combination applied or assumed may be transmitted by combining at least one of RRC signaling, MAC CE, and DCI. Herein, the indicator or the instruction may be defined as at least one value indicating the band combination, or may be defined to be implicitly represented or determined by at least one or more other information. An implicitly representing and determining operation may include a proper calculation operation. When implicitly represented or determined, the band combination may be determined based on a plurality of other information or parameters.

Determining of Band Combination According to Predefined Rule

According to an embodiment, a band combination applied or assumed based on a pre-defined rule may be identified without additional signaling. For example, a UE may recognize information on a configured CC, may identify possible (or candidate) band combinations including configured CCs among band combinations reported to a base station, and may assume that a band combination having a parameter of a greatest value (e.g., a band combination having the greatest maximum number of layers) is applied among the identified band combinations. That is, when CCs are configured for CA, the UE may determine that a band combination having a highest capability is applied among UE capabilities related to the configured CC. When the maximum number of layers is fixed for each band, a band combination considering the greatest maximum number of layers may be assumed or determined for each band among band combinations. In case of a system in which the maximum supportable number of layers is configured differently for each CC in the same band, the configured CC may be taken into account to assume or determine a band by considering the greatest maximum number of layers for each CC.

As a specific example, it is assumed that there is a band combination as shown in Table 16 below.

identified) based at least in part on the set of candidate band combinations (and feature sets).

Example: The maximum number of layers for (corresponding to) a component-carrier (or band) is identified (or determined) by the maximum (or minimum, or average) value of maxNumberMIMO-LayersPDSCH (or maxNumberMIMO-LayersCB-PUSCH, or maxNumberMIMO-LayersNonCB-PUSCH) across all configurable (or possible or candidate) band combinations and feature sets for the component-carrier (or band).

When the band combination such as Table 16 above is available, if CA is applied for FR1-Band1-CC3 and FR2-Band1-CC3, possible band combinations may be BC1, BC2, or BC4. In this case, a maximum value for the max_layers for each CC may be represented as (8, 4), but there may be no band combination corresponding to the maximum value (8, 4). When the band combination is determined according

TABLE 16

|  |  | FR1-Band1 | | | | FR1-Band2 | | | | FR1-Band3 | | | | FR2-Band1 | | | |
| --- | --- | --- | --- | --- | --- | --- | --- | --- | --- | --- | --- | --- | --- | --- | --- | --- | --- |
|  |  | CC1 | CC2 | CC3 | CC4 | CC1 | CC2 | CC3 | CC4 | CC1 | CC2 | CC3 | CC4 | CC1 | CC2 | CC3 | CC4 |
| BC1 | max_layers | 8 | 8 | 8 | 8 |  |  |  |  |  |  |  |  | 2 | 2 | 2 | 2 |
| BC2 | max_layers | 4 | 4 | 4 | 4 | 4 | 4 | 4 | 4 |  |  |  |  | 2 | 2 | 2 | 2 |
| BC3 | max_layers | 4 | 4 | 8 | 8 | 4 | 4 |  |  | 4 | 4 |  |  |  |  |  |  |
| BC4 | max_layers |  | 4 | 4 |  |  |  |  |  | 8 | 8 | 4 | 4 |  |  | 4 | 2 |

If CA is applied for FR1-Band1-CC1 and FR2-Band1-CC1, both the band combinations BC1 and BC2 are possible as described above, and a possible maximum value for the maximum number of layers (i.e., max_layers) for each CC may be represented such as (8, 2). In the disclosure described below, the maximum value of the max_layers is sequentially indicated for each band or CC, unless otherwise specified. Accordingly, when it is ambiguous to transmit the band combination as such, the band combination may be assumed or determined as the BC1. On the other hand, if CA is applied for FR1-Band1-CC1 and FR1-Band2-CC3, since only the band combination BC2 is possible, the max_layers may be determined exactly as (4, 4).

As such, candidate band combinations in which a band or CC combination is configurable for one band or CC combination, which is reported by the UE to the base station, may be identified or determined, and then the max_layers for each band or CC possible for the reported band combination may be identified or determined. The aforementioned embodiments are for a case of using the maximum value of the max_layers configurable for each band or CC in candidate band combinations, but a minimum value, an average value, or the like may also be used according to a system. As a result, the max_layers depending on each band or CC may be determined based on the maximum number of layers, defined in a candidate band combination possibly including CCs configured for CA and a feature set corresponding thereto, and a process thereof may be represented as follows.

Identify component-carriers (or bands) configured (or reported) for a carrier aggregation.

Identify (or Determine) a set of candidate band combinations including a plurality of the component-carriers (or bands) configured (or reported) for a carrier aggregation.

The maximum number of layers for (corresponding to) a component-carrier (or a band) in the plurality of the component-carriers (or bands) can be determined (or to such a pre-defined rule, a possibility of being determined as parameters not considered in a real system increases along with an increase in an ambiguity of the parameter. In order to minimize this problem, the band combination shall be configured to avoid the ambiguity of the parameter as much as possible. In this case, however, the band combination may be excessively restricted.

Accordingly, the disclosure proposes a band combination having a specific feature so as not to deviate from the parameter considered in the real system as much as possible without increasing the restriction on the band combination. In other words, if at least some band combination sets have the specific feature proposed in the disclosure among all band combinations, a case of being given by parameters not used in the real system may be at least excluded when applying CA for CCs included in the band combination set.

It is assumed that CA is applied for any two CCs or bands as shown in Table 17.

TABLE 17

|  | $1^{st}$ CC (or band) | $2^{nd}$ CC (or band) |
| --- | --- | --- |
| $1^{st}$ band combination | Max_layers_11 | Max_layers_12 |
| $2^{nd}$ band combination | Max_layers_21 | Max_Layers_22 |

In this case, a case of satisfying the following condition 1 is considered.

Condition 1

When the maximum number of layers (max_layers_11) for the first CC or band of the first band combination is greater than or equal to the maximum number of layers (max_layers_21) for the first CC or band of the second band combination, the maximum number of layers (max_layers_12) for the second CC or band of the first band combination is also greater than or equal to the maximum number of layers (max_layers_22) for the second CC or band of the second band combination ((max_layers11≥max_layers21) AND (max_layers12≥max_layers22))

Alternatively, when the maximum number of layers (max_layers_11) for the first Cc or band of the first band combination is less than the maximum number of layers (max_layers_21) for the first CC or band of the second band combination, the maximum number of layers (max_layers_12) for the second CC or band of the first band combination is also less than the maximum number of layers (max_layers_22) for the second CC or band of the second band combination.

((max_layers11≤max_layers21) AND (max_layers12≤max_layers22))

If a band combination is configured for Table 17 above to always satisfy the condition 1, when a predetermined rule such as a maximum value, a minimum value, an average value, or the like is applied per CC or band with respect to a case of an ambiguous band combination in which a parameters is not clearly defined, it is possible to assume or determine parameters of a band combination which exists in practice.

For example, when Table 16 is changed as shown in Table 18 or Table 19 below to satisfy the condition 1, it is possible to assume parameters for the maximum number of layers which always exist in practice in any circumstances. Therefore, a parameter to be selected may not deviate significantly from an aspect to be considered in the system.

(max_layers_21) for the first CC or band of the second band combination is less than (or less than or equal to) a first reference value X, an a difference between the maximum number of layers (max_layers_12) for the second CC or band of the first band combination and the maximum number of layers (max_layers_22) for the second CC or band of the second band combination is less than (or less than or equal to) a second reference value. (X and Y may be the same positive integer. |max_layers11-max_layers21|≤X AND |max_layers11-max_layers21|≤Y)

When the condition 2 is applied, a degree of freedom increases in selecting of the band combination configurable in the system, but there may be a significant difference from the parameter considered in the real system. Therefore, it is required to properly select the values X and Y. In addition, the values X and Y may be given by considering a feature of a band in which each CC is configured. For example, X and Y may be given by the same value such as X=Y=1 or X=Y=2 or X=Y=4. However, X and Y may be given by different values such as (X, Y)=(2, 1) or (4, 2) or (4, 1).

According to whether CC belongs to FR1 or FR2, different criteria may be applied as follows.

Condition 3

If the first CC and the second CC are configured in FR1, (|max_layers11-max_layers21|≤X1) AND (|max_layers11-max_layers21|≤Y1)

TABLE 18

|  |  | FR1-Band1 | | | | FR1-Band2 | | | | FR1-Band3 | | | | FR2-Band1 | | | |
| --- | --- | --- | --- | --- | --- | --- | --- | --- | --- | --- | --- | --- | --- | --- | --- | --- | --- |
|  |  | CC1 | CC2 | CC3 | CC4 | CC1 | CC2 | CC3 | CC4 | CC1 | CC2 | CC3 | CC4 | CC1 | CC2 | CC3 | CC4 |
| BC1 | max_layers | 8 | 8 | 8 | 8 |  |  |  |  |  |  |  |  | 2 | 2 | 2 | 2 |
| BC2 | max_layers | 4 | 4 | 4 | 4 | 4 | 4 | 4 | 4 |  |  |  |  | 2 | 2 | 2 | 2 |
| BC3 | max_layers | 4 | 4 | 4 | 4 | 4 | 4 |  |  | 4 | 4 |  |  |  |  |  |  |
| BC4 | max_layers |  |  | 4 | 4 |  |  |  |  | 8 | 8 | 4 | 4 |  |  | 2 | 2 |

TABLE 19

|  |  | FR1-Band1 | | | | FR1-Band2 | | | | FR1-Band3 | | | | FR2-Band1 | | | |
| --- | --- | --- | --- | --- | --- | --- | --- | --- | --- | --- | --- | --- | --- | --- | --- | --- | --- |
|  |  | CC1 | CC2 | CC3 | CC4 | CC1 | CC2 | CC3 | CC4 | CC1 | CC2 | CC3 | CC4 | CC1 | CC2 | CC3 | CC4 |
| BC1 | max_layers | 8 | 8 | 8 | 8 |  |  |  |  |  |  |  |  | 2 | 2 | 2 | 2 |
| BC2 | max_layers | 4 | 4 | 4 | 4 | 4 | 4 | 4 | 4 |  |  |  |  | 2 | 2 | 2 | 2 |
| BC3 | max_layers | 4 | 4 | 8 | 8 | 4 | 4 |  |  | 8 | 8 |  |  |  |  |  |  |
| BC4 | max_layers |  |  | 4 | 4 |  |  |  |  | 8 | 8 | 4 | 4 |  |  | 2 | 2 |

When the condition 1 is used, even if there is an ambiguity in a parameter, it is possible to apply a simple rule so as to be always determined as a parameter considered in a real system. However, since a restriction on a band combination may be slightly increased, if the condition 1 is more relieved, a possibility of not being given by a parameter considered in the real system is increased, but the restriction on the band combination may be reduced.

For example, it is assumed that there is a band combination satisfying the following condition 2.

Condition 2

A difference between the maximum number of layers (max_layers_11) for the first CC or band of the first band combination and the maximum number of layers If the first CC is configured in RF1, and the second SS is configured in FR2,
(|max_layers11-max_layers21|≤X1)
AND (|max_layers11-max_layers21|≤Y2)

If the first CC is configured in FR2, and the second CC is configured in FR1,
(|max_layers11-max_layers21|≤X2)
AND (|max_layers11-max_layers21|≤Y1)

If the first CC and the second CC are configured in FR2,
(|max_layers11-max_layers21|≤X2)
AND (|max_layers11-max_layers21|≤Y2)

However, at least one of (X1>X2) and (Y1>Y2) shall be satisfied.

As a specific example of applying the condition 3, various values may be applied such as (X1, Y1, X2, Y2)=(4, 4, 2, 2) or (4, 4, 2, 0) or (4, 4, 0, 0) or (4, 4, 2, 0) or (4, 0, 0, 0) or (2, 2, 2, 0) or (2, 2, 0, 0) or (2, 0, 0, 0) or the like.

As another embodiment, an operation described below is for a case where the maximum number of layers is defined differently for the same band or for each CC according to a band combination, but an ambiguity is removed depending on a system configuration.

When band combinations as shown in Table 20 are defined, if CA is applied for Band1-CC1 and Band3-CC2, both the band combination BC1 and the band combination BC2 are possible. In this case, if the maximum number of layers, i.e., max_layers, is not clearly given, the maximum number of layers may be configured according to a predetermined rule. For example, if a maximum value among values indicating the possible maximum number of layers for each CC is used, it may be given by (8, 2). Otherwise, if a minimum value is used, it may be given by (4, 1).

TABLE 20

|  |  | Band1 | | | | Band2 | | | | Band3 | | | |
| --- | --- | --- | --- | --- | --- | --- | --- | --- | --- | --- | --- | --- | --- |
|  |  | CC1 | CC2 | CC3 | CC4 | CC1 | CC2 | CC3 | CC4 | CC1 | CC2 | CC3 | CC4 |
| BC1 | max_layers | 8 | 8 | 8 | 8 |  | 8 | 4 |  | 2 | 1 |  |  |
| BC2 | max_layers | 4 | 4 | 4 | 4 |  | 4 | 4 |  |  | 1 | 2 | 1 |
| BC3 | max_layers | 4 | 4 |  |  | 4 | 4 | 8 | 8 |  | 2 | 1 |  |

However, if CA is applied for Band1-CC1 and Band3-CC2, the maximum number of layers is clearly given for Band3-CC2, and if a value thereof is transmitted through signaling information, the maximum value may be configured differently. For example, if the maximum number of layers of Band3-CC2 is given by 2 in the base station, it is possible to determine that the band combination is BC3. Therefore, the maximum number of layers of Band1-CC1 may be clearly given by 4.

Similarly, if CA is applied for Band1-CC1, Band2-CC2, and Band3-CC2, when the maximum number of layers of Band2-CC2 is clearly given by 8, it is identified that the band combination corresponds to the band combination BC1. Therefore, the maximum number of layers of Band1-CC1 and the maximum number of layers of Band3-CC2 may be clearly given by 8 and 1, respectively.

Otherwise, if CA is applied for Band1-CC1, Band2-CC2, and Band3-CC2, when the maximum number of layers of the Band2-CC2 is clearly given by 4, it may be identified that the band combination is BC2 or BC3. Therefore, it may be clearly determined that the maximum number of layers of Band1-CC1 is 4, but whether the maximum number of layers of Band3-CC2 is 1 or 2 is not clearly determined. In this case, the maximum number of layers may be determined according to a predetermined rule. For example, the maximum number of layers may be given by 2 if it is predetermined to be given by a maximum value by rule, and may be given by 1 if it is predetermined to be given by a minimum value by rule.

As such, a method may be implemented such that, if there is at least one value predetermined as the maximum number of layers for a specific band or for each CC, the maximum number of layers is clearly determined for each of the specific bands or for each CC, and whether there is an ambiguity for a band combination is determined for the remaining bands or for each CC, and then possible band combinations are determined based on a band or CC, in which the maximum number of layers is predetermined, and the maximum number of layers, and if there is only one possible band combination, the maximum number of layers for each band or for each CC, defined in the band combination, is determined or configured as the maximum number of layers. However, if there are two or more possible band combinations, the maximum number of layers may be configured for each band or CC according to a predetermined rule.

If the maximum number of layers is clearly given for at least one band or CC, a method of determining the maximum number of layers for each band or for each CC may be represented as follows. It is obvious that the method described below is applicable to a case where the maximum number of layers is not configured at all for each band or for each CC. In addition, some of operations may be optionally omitted, and a new operation may be added.

Identify a CC configured (or reported) for CA (i.e., Identifying component-carriers (or bands) configured (or reported) for a carrier aggregation).

Identify the maximum number of layers configured for at least one band or each CC (i.e., identifying the maximum number of layers for (corresponding to) at least a (or each) component carrier (or band)).

Identify a possible band combination, based on the identified maximum number of layers for each band or CC (i.e., identifying possible (or candidate) band combinations based on the identified maximum number of layers for (corresponding to) the component carrier (or band)).

When the number of possible band combinations is 1, determine (or configure or identify) the maximum number of layers configurable according to the band combination (for other CCs except for the CC) as the maximum number of layers for each band or CC (i.e., in case that the number of possible band combinations is 1, determining the maximum number of layers corresponding to a component carrier (or band) different from the component carrier (or band) by the maximum number of layers configurable according to the band combination).

When the number of possible band combinations is at least 2, determine (or configure or identify) the maximum number of layers for each band or CC, based on the maximum numbers of layers configurable according to the band combination (for other CCs except for the CC) and a predetermined rule (e.g., setting to a maximum value or minimum value of the maximum numbers of layers configurable for each CC or band) (i.e., in case that the number of possible band combinations is larger than 1, determining the maximum number of layers corresponding to a component carrier (or band) different from the component carrier (or band) based on a predetermined rule (e.g., max/min operation) and the numbers of layers configurable according to the band combinations).

As another embodiment, it is also possible to apply a method of removing an ambiguity such that the maximum number of layers is not defined to be different for the same band or for each CC according to a band combination. That is, when a UE transmits information on an acceptable band combination to a base station, the base station may configure CCs for CA, based on the information on the band combination, such that the maximum number of layers for each CC is given by the same value in a band combination corresponding to the CCs configured for CA (or a possible band combination including the CCs) (i.e., It may be possible to configure (or identify or determine) component-carriers (or bands) for a carrier aggregation such that the maximum number of layers for each configured component carrier (or band) in any possible band combinations corresponding to (or including) the configured component carriers (or bands) has a same value.). Therefore, in case of the UE, the maximum number of layers for each CC may be determined (or configured or identified) more simply as follows.

- Identify CCs configured (or reported) for CA (i.e., Identifying component-carriers (or bands) configured (or reported) for a carrier aggregation).
- Identify the maximum number of layers configured for each CC (or band), based on at least one of band combinations corresponding (or including) the CCs (i.e., identifying the maximum number of layers for each component carrier (or band) based on at least one of band combinations corresponding to the component carriers).
- In this case, when the number of possible band combinations corresponding to the CCs is at least 2, the maximum number of layers of each CC corresponding to a first band combination is equal to the maximum number of layers of each CC included in a second band combination (i.e., in case that the number of the band combinations is larger than 1, the maximum numbers of layers for each component carrier (or band) corresponding to a first band combination and a second band combination are same).

Method for Supporting UE Having Low Capability

When a UE having a low capability accesses a base station, it is required to identify the UE having the low capability and/or to apply a different system parameter to the UE having the low capability. For example, the UE having the low capability may be an MTC UE. Herein, the UE having the low capability may be referred to as an NR lite or an NR light, but the disclosure is not limited thereto. Hereinafter, for convenience of explanation, the UE having the low capability is referred to as a 'low capability UE', and a UE having a capability satisfying a requirement is referred to as a 'normal UE'.

According to various embodiments, a system may define a requirement for the UE. For example, the requirement may be defined to include that: transmission and reception are possible over an entire frequency bandwidth operating in an accessing frequency band; 64-QAM is supported; four layers are supported at FR1; and two layers are supported at FR2. However, the requirement may result in an increase in complexity of UE implementation or an increase in cost of UE implementation. Optionally, for example, a UE having a lower capability than the requirement may access the base station according to a service type, an easiness of implementation, or the like. In this case, the following embodiments are applicable in order for the base station to support the UE having the lower capability.

Providing Additional System Information

According to an embodiment, a base station may provide system information for a low-capability UE. For example, the base station may transmit a System Information Block (SIB) for the low-capability UE. In addition, scheduling information on SIB for the UE may be included in a Master Information Block (MIB) transmitted in a Physical Broadcast Channel (PBCH). For example, the SIB for the low-capability UE may include at least one of parameters such as maxMIMO-Layers of PDSCH-ServingCellConfig, maxMIMO-Layers of PUSCH-ServingCellConfig, maxRank of pusch-Config, mcs-Table, mcs-TableTransformPrecoder. In addition, the aforementioned parameters may also be included in another signaling information or parameter.

Reporting that Capability is Low Through Random Access Procedure

According to an embodiment, a UE may notify a base station that the UE has a low capability. In a random access procedure performed by the UE to access the base station, the low-capability UE may notify that a capability thereof is lower than a system requirement. For example, having the low capability may be indicated by using a Random Access Channel (RACH) preamble or by using a resource for transmitting the RACH preamble. To this end, the base station may configure a preamble or resource for random access of the low-capability UE, in addition to a resource for normal UEs. Information on the preamble or resource for random access of the low-capability UE may be provided as system information (e.g., SIB for the low-capability UE).

When the low-capability UE is recognized, the base station may apply a specific parameter for signal transmission/reception and scheduling for the UE. For example, when LBRM is performed on the UE, if the UE fails to receive from the base station the maximum number of layers assumed or supported in a corresponding BWP and also fails to exchange accurate UE capability parameters with the base station, the base station determines the maximum number of layers assumed or supported by the UE at the BWP as a specific value. The maximum number of layers assumed for the low-capability UE may a value different from those of normal UEs.

For example, the maximum number of layers of the UE, used to calculate $TBS_{LBRM}$, is used as a value configured from the base station. However, if there is no configuration achieved by the base station, it may be used as the maximum number of layers supported by the UE, and if there is no exchange of a UE capability parameter between the base station and the UE, it may be used as a default value. In this case, there may be a need to define the default value. In case of a normal UE, the base station may calculate $TBS_{LBRM}$ by assuming that the default value is 4 at FR1 and 2 at FR2. Otherwise, for a low-capability UE, the base station may assume that the default value is 2 at FR1 and 1 at FR2. In addition thereto, for the low-capability UE, a default value of a maximum modulation order Qm supported by the UE as a parameter used to calculate $TBS_{LBRM}$ may be defined as a value corresponding to 16-QAM. In addition, for the low-capability UE, a default value for a value for scheduling used to calculate a maximum data rate supported by the UE may be defined as a value smaller than 1. As such, the low-capability UE may be configured with some parameters given in the normal UE and at least one different default value, and the given value may correspond to a case where a lower capability than the normal UE is supported.

Method of Performing Uplink LBRN

Various embodiments described below are for effective uplink LBRM (e.g., UL-SCH LBRM or PUSCH LBRM) when transmitting data. When PUSCH-LBRM is applied, $TBS_{LBRM}$ may be determined based on the following configurations.

[Configuration a for Rate Matching Considering PUSCH-LBRM]

The maximum number of layers for one TB for UL-SCH may be given by X as follows.

TABLE 21

| Configuration | Content |
|---|---|
| 0 | (If the higher layer parameters maxMIMO-Layers-BWP of PUSCH-ServingCellConfigBWP of all BWPs of the serving cell are configured, X is given by the maximum value among maxMIMO-Layers-BWP) |
| 1 | (else if the higher layer parameter maxMIMO-Layers of PUSCH-ServingCellConfig of the serving cell is configured, X is given by that parameter) |
| 2 | (else if the higher layer parameter maxRank of pusch-Config of the serving cell is configured, X is given by the maximum value of maxRank across all BWPs of the serving cell) |
| 3 | (otherwise, X is given by the maximum number of layers for PUSCH supported by the UE for the serving cell) |

In the embodiment of Table 21, when the maximum number of layers is configured for a plurality of BWPs, X is given by a maximum value among the maximum numbers of layers. According to another embodiment, X may be given by a minimum value among the maximum numbers of layers. According to another embodiment, X may be given by a value (e.g., a median value, an average value, etc.) determined based on the maximum numbers of layers.

In addition, in the embodiment of Table 21, when maximum ranks are configured for a plurality of BWPs, X is given by a maximum value among the maximum ranks. According to another embodiment, X may be given by a minimum value among the maximum ranks. According to another embodiment, X may be given by a value (e.g., a media value, an average value, etc.) determined based on the maximum ranks.

In the embodiment of Table 21, in the configurations 0 and 2, X is given based on all BWPs of the serving cell. However, according to another embodiment, X may be given based on all active BWPs or an active BWP or all configured BWPs depending on a system. According to another embodiment, X may be given based on a plurality of BWPs satisfying a specific condition.

Operations of a UE for the aforementioned configuration for PUSCH-LBRM will be described below with reference to FIG. 13 and FIG. 14.

Figure 13:
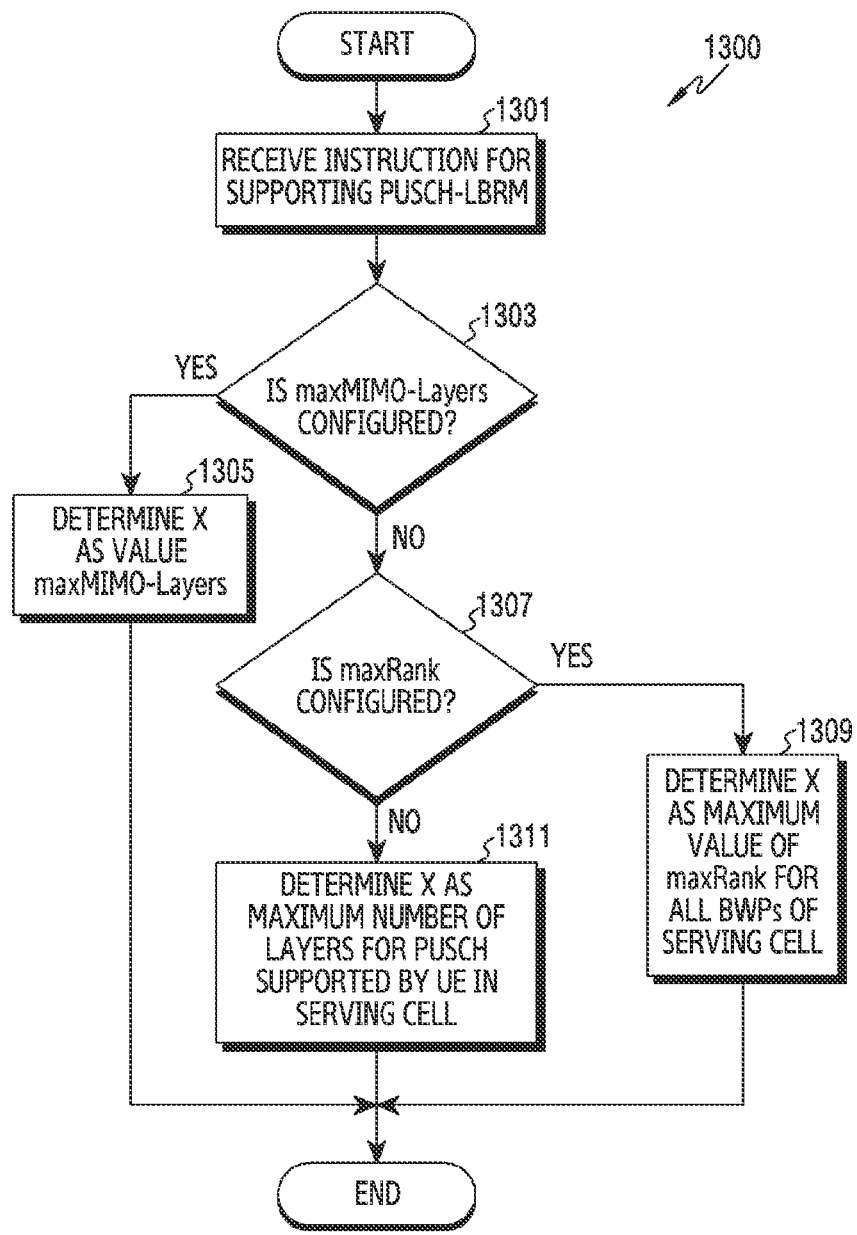
FIG. 13 illustrates a flowchart of a UE for determining the maximum number of layers in a wireless communication system according to various embodiments of the disclosure.

FIG. 13 illustrates a flowchart 1300 of a UE for determining the maximum number of layers in a wireless communication system according to various embodiments of the disclosure. A method of operation the UE 120 is exemplified in FIG. 13.

Referring to FIG. 13, in step 1301, the UE receives an instruction for PUSCH-LBRM. In step 1303, the UE identifies whether a parameter maxMIMO-Layers-BWP is configured. Herein, the parameter maxMIMO-Layers-BWP may be configured for each BWP with respect to at least one BWP. When the parameter maxMIMO-Layers-BWP is configured, in step 1305, the UE determines X, based on values maxMIMO-Layers-BWP for respective BWPs. For example, X may be given by any one of a maximum value, minimum value, average value, and median value of the values maxMIMO-Layers-BWP. BWPs considered in this case may be all BWPs, enabled BWPs, or BWPs satisfying a specific condition.

If the parameter maxMIMO-Layers-BWP is not configured, in step 1307, the UE identifies whether the parameter maxMIMO-Layer is configured. If the maxMIMO-Layer is configured, in step 1309, the UE determines X as the value maxMIMO-Layer. Otherwise, if the maxMIMO-Layer is not configured, in step 1311, the UE identifies whether a parameter maxRank is configured. If the maxRank is configured, in step 1313, the UE determines X as a maximum value of the maxRank for all BWPs of a serving cell. Otherwise, if the maxRank is not configured, in step 1315, the UE determines X as the maximum number of layers for a PUSCH supported by the UE in the serving cell.

Figure 14:
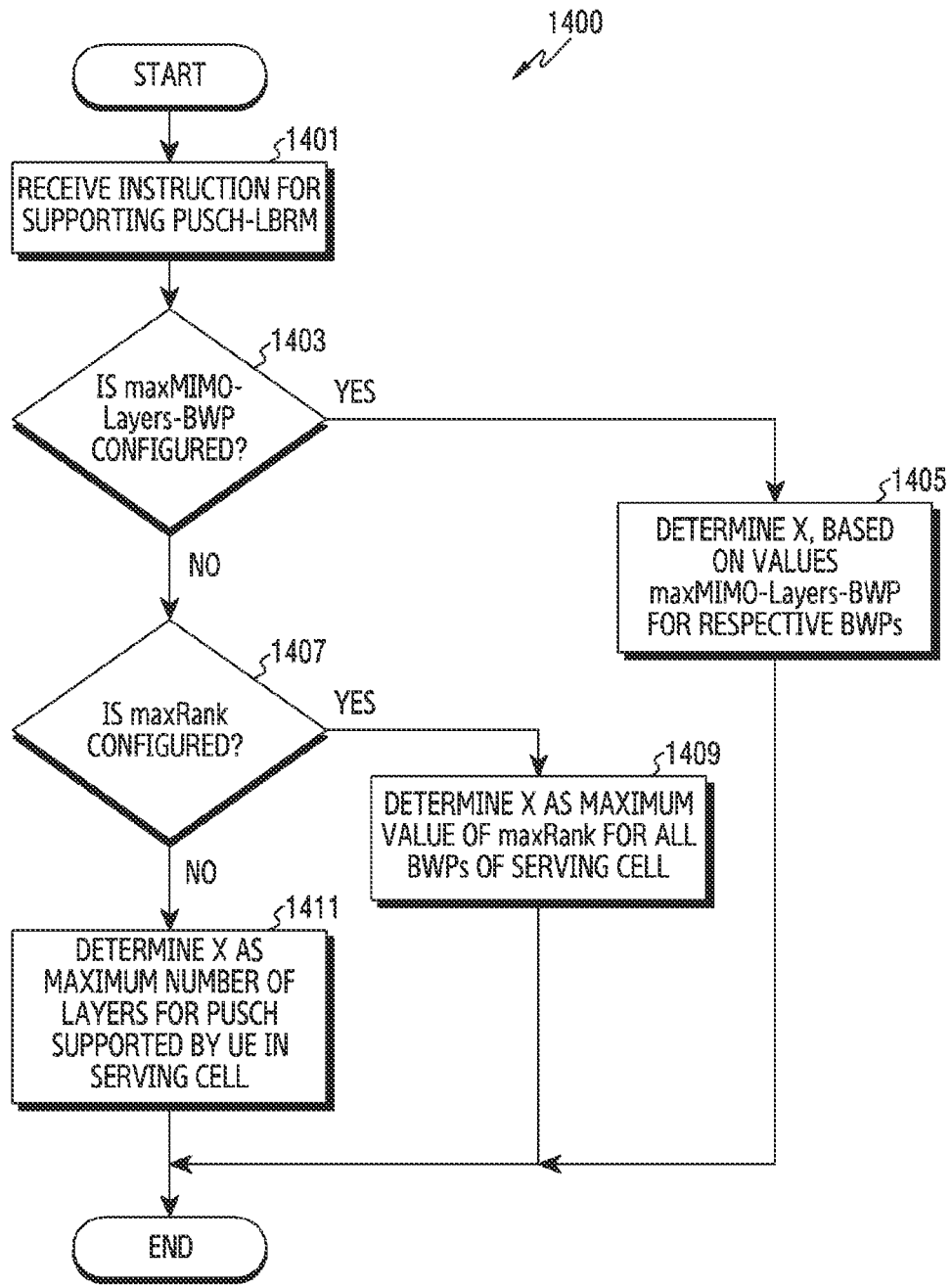
FIG. 14 illustrates another flowchart of a UE for determining the maximum number of layers in a wireless communication system according to various embodiments of the disclosure.

FIG. 14 illustrates another flowchart 1400 of a UE for determining the maximum number of layers in a wireless communication system according to various embodiments of the disclosure. A method of operating the UE 120 is exemplified in FIG. 14. In the embodiment of FIG. 14, the steps 1303 and 1305 in the embodiment of FIG. 13 are excluded. The embodiment of FIG. 14 is also applicable to a case where a parameter maxMIMO-Layers included in PUSCH-ServingCellConfig configured in the base station is equal to maxRank included in pusch-Config.

Referring to FIG. 14, in step 1401, the UE receives an instruction for PUSCH-LBRM. In step 1403, the UE identifies whether a parameter maxMIMO-Layers-BWP is configured. Herein, the parameter maxMIMO-Layers-BWP may be configured for each BWP with respect to at least one BWP. When the parameter maxMIMO-Layers-BWP is configured, in step 1405, the UE determines X, based on values maxMIMO-Layers-BWP for respective BWPs. For example, X may be given by any one of a maximum value, minimum value, average value, and median value of the values maxMIMO-Layers-BWP. BWPs considered in this case may be all BWPs, enabled BWPs, or BWPs satisfying a specific condition.

If the parameter maxMIMO-Layers-BWP is not configured, in step 1407, the UE identifies whether a parameter maxRank is configured. If the maxRank is configured, in step 1409, the UE determines X as a maximum value of the maxRank for all BWPs of a serving cell. Otherwise, if the maxRank is not configured, in step 1411, the UE determines X as the maximum number of layers for a PUSCH supported by the UE in the serving cell.

Summarizing again the aforementioned rate matching process considering the PUSCH-LBRM, it is obvious that a modified configuration is also applicable as follows.

[Configuration B for Rate Matching Considering PUSCH-LBRM]

The maximum number of layers for one TB may be given by X as follows.

TABLE 22

| Configuration | Content |
|---|---|
| 0 | (If the higher layer parameters maxMIMO-Layers-BWP of PUSCH-ServingCellConfigBWP of all BWPs of the serving cell are configured, X is given by the maximum value among maxMIMO-Layers-BWP) |
| 1 | (else if the higher layer parameter maxRank of pusch-Config of the serving cell is configured, X is given by the maximum value of maxRank across all BWPs of the serving cell) |
| 2 | (otherwise, X is given by the maximum number of layers for PUSCH supported by the UE for the serving cell) |

In the embodiment of Table 22, when the maximum number of layers is configured for a plurality of BWPs, X is given by a maximum value among the maximum numbers of layers. According to another embodiment, X may be given by a minimum value among the maximum numbers of layers. According to another embodiment, X may be given by a value (e.g., a median value, an average value, etc.) determined based on the maximum numbers of layers.

In addition, in the embodiment of Table 22, when maximum ranks are configured for a plurality of BWPs, X is given by a maximum value among the maximum ranks. According to another embodiment, X may be given by a minimum value among the maximum ranks. According to another embodiment, X may be given by a value (e.g., a media value, an average value, etc.) determined based on the maximum ranks.

In addition, in the configurations 0 and 2 in the embodiment of Table 22, X is given based on all BWPs of the serving cell. However, more specifically, according to a system, all active BWPs or all configured BWPs may be used as a criterion, or a plurality of BWPs satisfying a specific condition may be used as a criterion.

For reference, although it is described in the embodiment of Table 21 and Table 22 that signaling information including maxMIMO-Layers-BWP is PUSCH-ServingCellConfigBWP, a name of signaling information or a parameter may be set to other names in general according to a communication system or version information of the system.

According to another embodiment, for rate matching considering the PUSCH-LBRM, parameters may be configured by considering a band combination and feature set associated with at least one serving cell (or configured at least one serving cell). For example, the maximum number or layers may be determined by considering any signaled or indicated band combination and feature set associated with the serving cell. An embodiment for this will be described in the following section [Configuration C for rate matching considering PUSCH-LBRM].

[Configuration C for rate matching considering PUSCH-LBRM]

The maximum number of layers for one TB for UL-SCH may be given by X as follows.

TABLE 23

| Configuration | Content |
| --- | --- |
| 0 | (if the higher layer parameter maxMIMO-Layers of PUSCH-ServingCellConfig of the serving cell is configured, X is given by that parameter) |
| 1 | (elseif the higher layer parameter maxRank of pusch-Config of the serving cell is configured, X is given by the maximum value of maxRank across all BWPs of the serving cell) |
| 2 | (otherwise, X is given by the maximum number of layers for PUSCH supported by the UE for any signaled band combination and feature set consistent with the serving cell) |

In the configuration 2 of Table 23, since the UE and the base station do not have common understanding on a band combination currently applied, X may be given by the greatest number of supported layers by considering all band combinations.

For successful decoding, in rate matching methods considering the aforementioned LBRM, both a base station and a receiver or both a transmitter and a receiver shall maintain the same configuration or an agreed configuration. In this case, it is obvious that various combinations for the configurations mentioned in the disclosure are possible.

Method of Performing Downlink LBRM

Various embodiments described below relate to effective downlink LBRM (e.g., PDSCH-LBRM, DL-SCH LBRM, or PCH LBRM) in data transmission. Hereinafter, although an embodiment for PDSCH-LBRM is described in the disclosure, the embodiment described below is also applicable to DL-SCH LBRM or PCH LBRM.

$TBS_{LBRM}$ is determined based on the maximum number of layers of a PUSCH or PDSCH configured in higher layer signaling (e.g., RRC signaling). However, since the maximum number of layers is not determined until information on a UE capability is reported from a UE to a base station, a problem may occur when applying the LBRM.

FIG. 15 illustrates an example of an interval in which an ambiguity of a parameter required to perform LBRM occurs in a wireless communication system according to various embodiments of the disclosure. Events occurring in an initial access process of a UE are exemplified in FIG. 15. Referring to FIG. 15, an SS/PBCH is detected at a first time point 1510, an RACH procedure is complete at a second time point 1520, UE capability information is requested at a third time point 1530, and reporting of UE capability information is complete at a fourth time point 1540.

For an interval 1550 between the second time point 1520 and the fourth time point 1540, there is a possibility that a configuration for the maximum number of layers of a PUSCH or PDSCH is different between a base station and the UE. In this case, PUSCH decoding in the base station may not be properly performed, and PDSCH decoding in the UE may not be properly performed. In other words, since the UE is not able to directly decode the PDSCH after the RACH procedure, the UE may not be able to receive any RRC message. Therefore, a rule between the base station and the UE is required to determine the maximum number of layers of the PUSCH or PDSCH until a UE capability is reported to the base station.

As one of the solutions to the aforementioned problem, it may be considered that a value X, i.e., the maximum number of layers, is fixed to a predetermined value or integer during the interval 1050 of FIG. 15. For example, a specific integer such as X=1 or =2 may be used, or a value mandated to the UE as the maximum number of layers in the band may be determined by definition. Although it is exemplified that X=1 in the following embodiment, the disclosure is not limited thereto.

For example, regarding the value X, i.e., the maximum number of layers during the interval 1550 of FIG. 15, the base station or the UE may determine X as the minimum number of layers which shall be supported by the UE and determined depending on a frequency band (e.g., FR1 or FR2). The minimum number of layers which shall be supported by the UE may be a configured value mandated to the UE. For example, the UE shall be able to support at least 4 layers at FR1, and the UE shall be able to support at least 2 layers at FR2. In this case, X may be given by 4 at FR1, and may be given by 2 at FR2.

As another example, regarding the value X, i.e., the maximum number of layers during the interval 1550 of FIG. 15, the base station or the UE may determine X as the maximum number of layers which may be supported by the UE at a corresponding band. The minimum number of layers which may be supported by the UE may be different from a value mandated to the UE. For example, when the UE is able to support up to 4 layers at FR1 and FR2, X may be given by 4 at both FR1 and FR2. In the disclosure, the maximum/ minimum number of layers may be the number of layers per TB used in one TB transmission.

Although the above examples are described by taking the interval 1550 of FIG. 15 for example, a similar method may be applied when a parameter maxMIMO-Layers included in higher layer signaling PDSCH-ServingCellConfig of the serving cell is not configured. In addition, the base station or the UE may determine the value X, based on the higher layer parameter max NumberMIMO-LayersPDSCH. If the value maxNumberMIMO-LayersPDSCH is not given, the base station or the UE may determine the value X as a predetermined value. For example, the base station or the UE may determine the value X as 4 at FR1 and 2 at the FR2. Alternatively, the base station or the UE may determine the value X as 4 at both FR1 and FR2. Alternatively, the base station or the UE may determine the value X as different values according to a system. Typically, the base station or the UE may determine a first value for FR1 to be greater than or equal to a second value for FR2, but the disclosure is not necessarily limited thereto.

Hereinafter, an embodiment for a PDSCH-LBRM method will be described in greater detail. The PDSCH-LBRM method described hereinafter may include a process in which a value X is given based on a value mandated to the UE as in the above embodiment or a method in which the value X is given based on a higher layer parameter maxNumberMIMO-LayersPDSCH, but several embodiments are omitted for convenience of explanation.

[Configuration a for Rate Matching Considering PDSCH-LBRM]

The maximum number of layers for one TB for DL-SCH/PCH is given by a minimum value out of X and 4.

TABLE 24

| Configuration | Content |
|---|---|
| 0 | (If the higher layer parameters maxMIMO-Layers-BWP of PDSCH-ServingCellConfigBWP of all BWP of the serving cell are configured, X is given by the maximum value among maxMIMO-Layers ) |
| 1 | (else if the higher layer parameter maxMIMO-Layers of PDSCH-ServingCellConfig of the serving cell is configured (or given), X is given by that parameter) |
| 2 | (else if the higher layer parameter maxNumberMIMO-LayersPDSCH is configured (or given), X is given by that parameter) |
| 3 | (otherwise, X = 1) |

According to another embodiment, the configuration 2 in Table 24 may be replaced with the same condition in Table 25 below.

TABLE 25

| Configuration | Content |
|---|---|
| 2 | If the higher layer parameters maxMIMO-Layers-BWP of PDSCH-ServingCellConfigBWP of all BWPs of the serving cell are configured, X is given by the maximum value among maxMIMO-Layers. else if the higher layer parameter maxNumberMIMO-LayersPDSCH is configured (or given), X is given by the maximum number of layers for PDSCH supported by the UE for the serving cell. |

In the configuration 3 of Table 24, X may be given by an integer (e.g., 2, 3, 4, . . . , etc.) different from 1, or may be given by another parameter. In addition, as described above, X may be given by another value according to FR1 or FR2. For reference, in the embodiment of Table 23 or Table 24, in a process in which X is given based on all BWPs of the serving cell, more specifically, according to a system, all active BWPs or all configured BWPs may be used as a criterion, or a plurality of BWPs satisfying a specific condition may be used as a criterion. For reference, although it is described in the embodiment of Table 23 and Table 24 that signaling information including maxMIMO-Layers-BWP is PDSCH-ServingCellConfigBWP, a name of signaling information or a parameter may be set to other names in general according to a communication system or version information of the system.

An operation of UE according to a rule as shown in Table 24 is described below with reference to FIG. 16.

Figure 16:
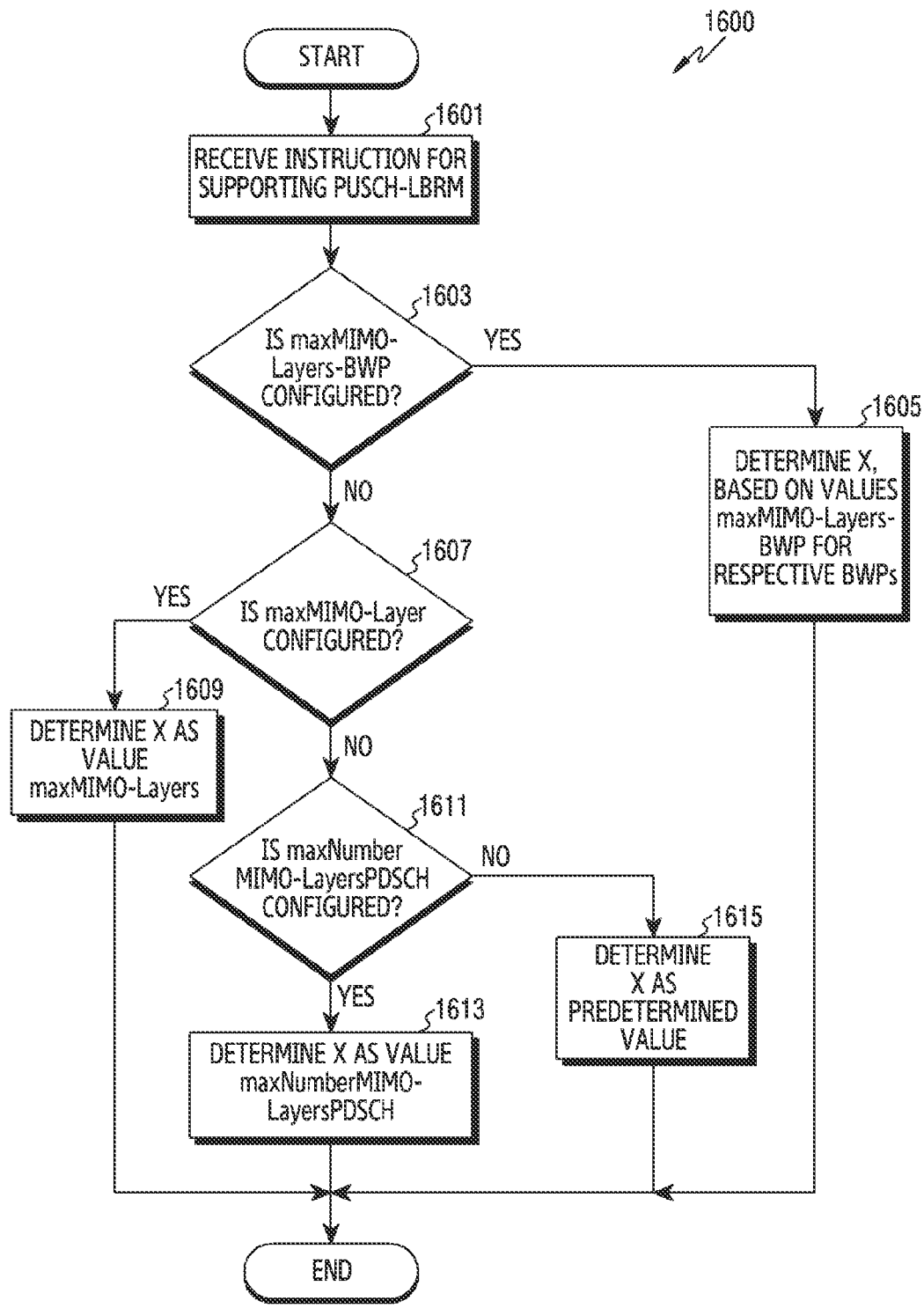
FIG. 16 illustrates another flowchart of a UE for determining the maximum number of layers in a wireless communication system according to various embodiments of the disclosure.

FIG. 16 illustrates another flowchart 1600 of a UE for determining the maximum number of layers in a wireless communication system according to various embodiments of the disclosure. A method of operation the UE 120 is exemplified in FIG. 16.

Referring to FIG. 16, in step 1601, the UE receives an instruction for PDSCH-LBRM. In step 1603, the UE identifies whether a parameter maxMIMO-Layers-BWP is configured. Herein, the parameter maxMIMO-Layers-BWP may be configured for each BWP with respect to at least one BWP. When the parameter maxMIMO-Layers-BWP is configured, in step 1605, the UE determines X, based on values maxMIMO-Layers-BWP for respective BWPs. For example, X may be given by any one of a maximum value, minimum value, average value, and median value of the values maxMIMO-Layers-BWP. BWPs considered in this case may be all BWPs, enabled BWPs, or BWPs satisfying a specific condition.

If the parameter maxMIMO-Layers-BWP is not configured, in step 1607, the UE identifies whether the parameter maxMIMO-Layer is configured. If the maxMIMO-Layer is configured, in step 1609, the UE determines X as the value maxMIMO-Layer. Otherwise, if the maxNumberMIMO-LayersPDSCH is not configured, in step 1611, the UE identifies whether a parameter maxNumberMIMO-LayersPDSCH is configured. If the maxNumberMIMO-LayersPDSCH is configured, in step 1613, the UE determines X as a value maxNumberMIMO-LayersPDSCH. Otherwise, if the maxNumberMIMO-LayersPDSCH is not configured, in step 1615, the UE determines X as a pre-predetermined value (e.g., 1).

According to another embodiment, for rate matching considering the PDSCH-LBRM, parameters may be configured by considering a band combination and feature set associated with at least one serving cell (or configured at least one serving cell). For example, when determining the maximum number of layers, the maximum number of layers may be determined by considering any signaled or indicated band combination and function feature associated with the serving cell. An embodiment for this will be described in the following section [Configuration B for rate matching considering PDSCH-LBRM].

[Configuration B for Rate Matching Considering PDSCH-LBRM]

The maximum number of layers for one TB for DL-SCH/PCH is given by a minimum value out of X and 4.

TABLE 26

| Configuration | Content |
|---|---|
| 1 | (if the higher layer parameter maxMIMO-Layers of PDSCH-ServingCellConfig of the serving cell is configured, X is given by that parameter) |

TABLE 26-continued

| Configuration | Content |
|---|---|
| 2 | (otherwise, X is given by the maximum number of layers for PDSCH supported by the UE for any signaled band combination and feature set consistent with the serving cell) |

In the configuration 2 of Table 26, since the UE and the base station do not have common understanding on a band combination currently applied, X may be given by the greatest number of supported layers by considering all band combinations.

An embodiment for a parameter configuration for applying LBRM of the disclosure may be represented in detail as follows.

[Configuration C for Rate Matching Considering PDSCH-LBRM]

Configuration 1: When maxNumberMIMO-LayersPDSCH is configured in higher layer signaling, the maximum number v of layers for one TB is given by a smaller value (or a smaller or identical value) resulting from comparison between 4 and the maxNumberMIMO-LayersPDSCH. If the maxNumberMIMO-LayersPDSCH is not set, the maximum number of layers for one TB is given to 1.

Configuration 2: If mcs-Table is configured with qam256 in higher layer signaling, a maximum modulation order is assumed as $Q_m=8$. Otherwise, it is assumed as $Q_m=6$.

Configuration 3: A maximum code rate is given by to R-948/1024.

Configuration 4: It is given by $N_{RE}=156*N_{PRB,LBRM}$. Herein, $N_{PRB,LBRM}$ denotes the maximum number of PRBs across all configured BWPs of a carrier.

The aforementioned configurations may be represented as follows.

if maxNumberMIMO-LayersPDSCH provided,
v=min (maxNumberMIMO-LayersPDSCH, 4);
else
v=1;
if mcs-Table=qam256,
Qm=8;
else
Qm=6;
R=948/1024;
$N_{RE}$=156*NPRB,LBRM When a parameter required to determine the maximum number of layers for one TB is configured in higher layer signaling as in the aforementioned [Configuration C for rate matching considering PDSCH-LBRM], the maximum number of layers may be determined based on the configured value. Otherwise, if the parameters are not configured in the higher layer signaling, the maximum number of layers may be given by a predetermined value (e.g., v=1, 2, 3, . . . , or the like) or may be given by a value determined according to a predetermined rule.

Similarly, parameters required to determine a maximum modulation order are configured in the higher layer signaling, the maximum modulation order may be determined based on the configured value. Otherwise, if the parameters are not configured in the higher layer signaling, the maximum modulation order may be given by a predetermined value, or may be given by a value determined according to a predetermined rule.

In addition, a condition for the mes-Table may be modified in various forms. For example, the maximum modulation order may be configured according to a BWP of a serving cell and according to whether qam256 is configured in the mes-Table. For example, various methods may be possible, such as, determining of Qm=8 when qam256 is configured for the mcs-Table for one or more BWPs or determining of Qm=8 when qam256 is configured for the mcs-Table for all BWPs. In addition, a similar method may also be possible based on a value such as mcs-TableTransformPrecoder instead of the mcs-Table.

The aforementioned various embodiments are described by focusing on an operation of a UE. However, for encoding or decoding to which LBRM in the base station is applied, the base station may also perform encoding or decoding after performing the same parameter configuration operation corresponding to the UE. In this case, an operation of the base station is similar to operations of the UE. In addition, it is obvious that various combinations for the PUSCH-LBRM method and the PDSCH-LBRM operation are applicable as the LBRM method of the base station and the UE. In other words, when the aforementioned rate matching methods considering the LBRM are used for successful decoding, both the base station and the UE or both a transmitting and a receiver shall maintain the same configuration or an agreed configuration. In this case, it is obvious that various combinations for the configurations mentioned in the disclosure are possible.

In general, the LBRM may affect performance since part of a parity may not be transmitted due to a restriction on a buffer. For this reason, the base station or the UE may configure an MCS so that the LBRM is not applied as much as possible or is applied as little as possible. For example, the base station or the UE may determine whether to apply the LBRM for cases of scheduling with each MCS after calculating a TBS for each MCS, and may not use the MCS when it is determined that the LBRM is applied. In other words, the base station or the UE may not use one MCS among MCSs to which the LBRM is not applied. Optionally, even if the LBRM is applied, the base station or the UE may configure a relatively high or highest MCS as a final MCS among the MCSs to which the LBRM is applied. Herein, whether to apply the LBRM may be determined by comparing values N and $N_{ref}$ for each MCS. For example, if $N>N_{ref}$ the LBRM may be applied, and otherwise, the LBRM may not be applied.

As described above, a method in which an MCS configuration is used to control applying of LBRM may be applied differently depending on a Stand-Alone (SA) mode or a Non-Stand Alone (NSA) mode. In case of a communication system or network to which the SA mode is applied, applying of the LBRM is controlled through the MCS configuration, but in case of a communication system or network to which the NSA mode is applied, a control to applying of the LBRM through the MCS configuration may not be applied. On the contrary, in case of the communication system or network to which the NSA mode is applied, applying of the LBRM is controlled through the MCS configuration, but in case of the communication system or network to which the SA mode is applied, a control to applying of the LBRM through the MCS configuration may not be applied. In addition, although the applying of the LBRM is controlled through the MCS configuration with respect to both the SA/NAS modes, specific rules may be defined to be different from each other. Herein, the SA mode is a mode in which a first cellular network (e.g., a legacy network) and a second cellular network (e.g., a 5G network) operate independently, and the NSA mode is a mode in which the first cellular network and the second cellular network operate in an inter-connected manner. Operating of two networks in a connected manner means that at least one network controls an operation of the other network.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have an access to a device for performing an embodiment of the disclosure via an external port. In addition, an additional storage device on a communication network may have an access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

INDUSTRIAL APPLICABILITY

The disclosure relates in general to a wireless communication system, and in particular, to a method and apparatus for transmitting/receiving data and control information in the wireless communication system.

The invention claimed is:

1. A method performed by a terminal in a wireless communication system, the method comprising:
receiving, from a base station, information configuring a limited buffer rate matching (LBRM);
encoding data bits using a low-density parity check (LDPC) code;
identifying a value based on at least one parameter included in the information, the value including one of a maximum value or a minimum value of a maximum number of layers;
determining a limited range of parity bits for the LBRM, based on the value;
performing the LBRM based on the encoded data bits and the limited range of the parity bits; and
transmitting, to the base station, at least one data bit of the encoded data bits, based on the LBRM.

2. The method of claim 1,
wherein the at least one parameter is for calculating a transport block (TB) size, and
includes at least one of information on the maximum number of layers or a band combination applied for a carrier aggregation (CA).

3. The method of claim 2, further comprising:
receiving an indicator indicating the band combination applied to for the CA.

4. The method of claim 1, wherein the at least one parameter is associated with one of the maximum number of the layers for a serving cell or maximum ranks for the serving cell.

5. The method of claim 1, wherein the at least one parameter associated with the maximum number of the layers for the serving cell is configured for a plurality of bandwidth parts (BWPs).

6. The method of claim 4, wherein the value further includes one of a maximum value or a minimum value of the maximum ranks.

7. A terminal in a wireless communication system, the terminal comprising:
a transceiver; and
a controller coupled to the transceiver, and configured to:
receive, from a base station, information configuring a limited buffer rate matching (LBRM);
encode data bits using a low-density parity check (LDPC) code,
identify a value based on at least one parameter included in the information, the value including one of a maximum value or a minimum value of a maximum number of layers,
determine a limited range of parity bits for the LBRM, based on the value;
perform the LBRM based on the encoded data bits and the limited range of the parity bits; and
transmit, to the base station, at least one data bit of the encoded data bits, based on the LBRM.

8. The terminal of claim 7,
wherein the at least one parameter is for calculating a transport block (TB) size, and
includes at least one of information on the maximum number of layers or a band combination applied for a carrier aggregation (CA).

9. The terminal of claim 8, wherein the controller is further configured to:
receive an indicator indicating the band combination applied for the CA.

10. The terminal of claim 7, wherein the at least one parameter is associated with one of the maximum number of the layers for a serving cell or maximum ranks for the serving cell.

11. The terminal of claim 10, wherein the at least one parameter associated with the maximum number of the layers for the serving cell is configured for a plurality of bandwidth parts (BWPs).

12. The method of claim 1, wherein the at least one parameter corresponds to a band combination supported by the terminal.

13. The terminal of claim 7, wherein the at least one parameter corresponds to a band combination supported by the terminal.

14. The terminal of claim 10, wherein the value further includes one of a maximum value or a minimum value of the maximum ranks.

\* \* \* \* \*